United States Patent [19]
Utsunomiya

[11] Patent Number: 5,943,192
[45] Date of Patent: Aug. 24, 1999

[54] MAGNETIC HEAD SUPPORTING MECHANISM FOR A SLIDER BEARING MEMBER AND METHOD FOR ASSEMBLING MAGNETIC DISK STORAGE COMPRISING THE SAME

[75] Inventor: Motoyasu Utsunomiya, Tokyo, Japan

[73] Assignee: NEC Corporation, Tokyo, Japan

[21] Appl. No.: 09/035,825

[22] Filed: Mar. 6, 1998

[30] Foreign Application Priority Data

Mar. 6, 1997 [JP] Japan ..................................... 9-051946

[51] Int. Cl.⁶ ....................................................... G11B 5/48
[52] U.S. Cl. ................................................................. 360/104
[58] Field of Search ............................................. 360/104

[56] References Cited

U.S. PATENT DOCUMENTS

H1573 8/1996 Budde ..................................... 360/104

FOREIGN PATENT DOCUMENTS

| 62-222472 | 9/1987 | Japan . |
| 6-28801 | 2/1994 | Japan . |
| 8-77738 | 3/1996 | Japan . |

*Primary Examiner*—A. J. Heinz
*Attorney, Agent, or Firm*—Sughrue, Mion, Zinn, Macpeak & Seas, PLLC

[57] ABSTRACT

A magnetic head supporting mechanism having: a rectangular slider bearing member for bearing a slider loaded with a magnetic head; a flexure member, provided so as to surround the slider bearing member, for supporting the slider bearing member in one end section thereof through a joining site; and a long load beam sheet, provided so as to surround the flexure member, for supporting the flexure member through a predetermined holding site (a flexure arm), the joining site, provided between the slider bearing member and the flexure member, having spring properties, the slider bearing member being inclined to the load beam. This magnetic head supporting mechanism can ensure satisfactory impact resistance and satisfactory slider supporting rigidity and can provide a method for assembling a magnetic disk storage comprising the magnetic head supporting mechanism having the above excellent properties.

6 Claims, 21 Drawing Sheets

118a  RIB

118b  RIB (a) UNLOADED STATE (b) LOADED STATE (c) PRESSING LOAD

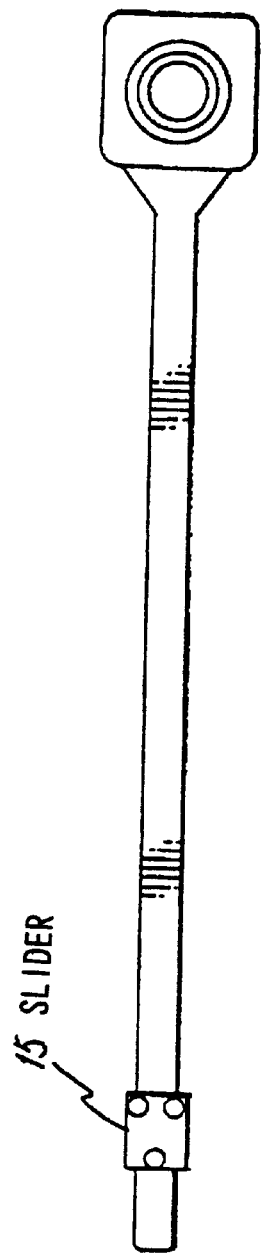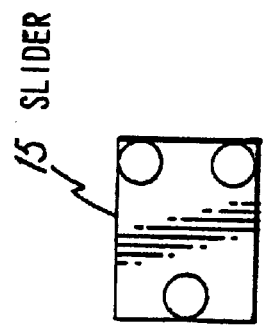
FIG. 10A PRIOR ART
FIG. 10B PRIOR ART
FIG. 10C PRIOR ART FIF. 20A
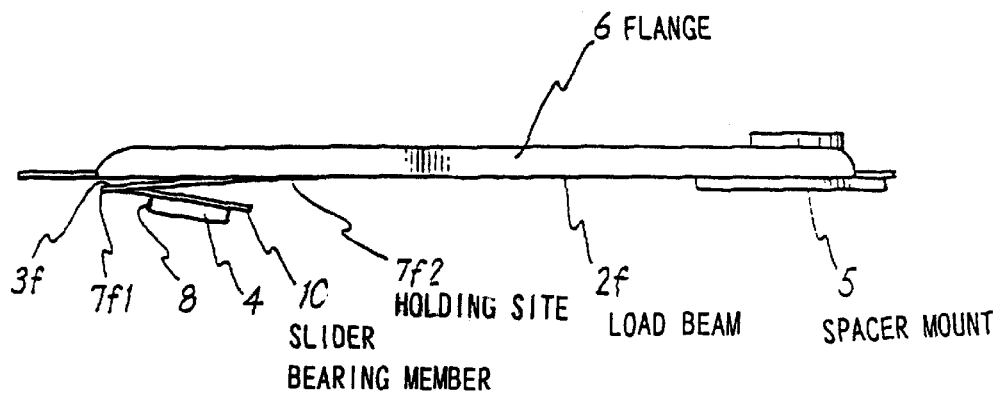
3f: FLEXURE MEMBER
7f1: JOINING SITE
8: MAGNETIC HEAD
4: SLIDER
FIG. 20B
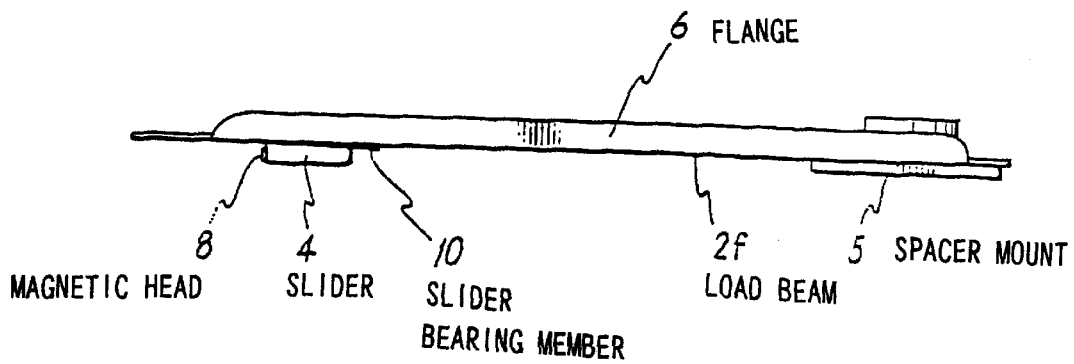

MAGNETIC HEAD SUPPORTING MECHANISM FOR A SLIDER BEARING MEMBER AND METHOD FOR ASSEMBLING MAGNETIC DISK STORAGE COMPRISING THE SAME

FIELD OF THE INVENTION

The present invention relates to a magnetic head supporting mechanism and a method for assembling a magnetic disk storage comprising the same, and more particularly to a magnetic head supporting mechanism for supporting a floating type or contact type magnetic head and a method for assembling a magnetic disk storage comprising the same.

BACKGROUND OF THE INVENTION

A conventional magnetic head supporting mechanism (suspension) in a magnetic disk storage comprises: a flexure member for supporting a slider loaded with a magnetic head; a load beam for holding the flexure member and applying a pressing load to the slider; and a spacer mount for connecting the load beam to a positioner mechanism.

In the case of the floating type magnetic head supporting mechanism, the slider generally undergoes an air viscous flow, created by high speed rotation of a magnetic disk (a recording medium), on an ABS (air bearing surface) provided on the side opposite to the magnetic disk to form an air layer which permits the slider to float over the magnetic disk while leaving a minute gap (floating height) of several tens of nm between the slider and the magnetic disk.

At that time, in order to stably maintain the floating height, it is necessary to suppress the slider supporting rigidity (roll/pitch rigidity) of the flexure member to ensure the flexibility of the floating motion.

On the other hand, high-speed and high-precision positioning of the magnetic head is indispensable for realizing high speed access to data in the magnetic disk storage, and high rigidity in a direction (seek direction) perpendicular to the longitudinal axis is required of an in-line type magnetic head supporting mechanism (in-line type: a magnetic head supporting mechanism wherein the load beam and the slider are provided so that the longitudinal axis of the slider is parallel to the longitudinal axis of the load beam) of a rotary actuator system (a positioner mechanism wherein the magnetic head is moved through arcuate motion of the magnetic head supporting mechanism by a voice coil motor).

Prior art techniques, wherein the load beam per se is improved in rigidity and strengthened to improve the vibration properties, include one wherein a rib is applied to the middle position of the load beam excluding a loading, bent section for applying a pressing load to the slider (Japanese Patent Laid-Open No. 28801/1994), one wherein ribs are applied to the loading, bent section (Japanese Patent Laid-Open No. 222472/1987), and one wherein a flange section is provided also on both the right and left sides of the loading, bent section (Japanese Patent Laid-Open No. 222472/1987).

An example of the conventional in-line type magnetic head supporting mechanism comprises a load beam, a flexure member, a slider, a spacer mount, a flange, a loading, bent section, a magnetic head, and a pivot.

The spacer mount is connected to a positioner mechanism to carry out positioning on a required track of a magnetic disk. The loading, bent section in the load beam has been plastically deformed and is constructed so that, when the slider is incorporated into the magnetic disk (recording medium D), a predetermined pressing load is applied to the slider.

The slider floats over the magnetic disk (recording medium) at a position where a balance between the pressing load and the buoyancy created by the air viscous flow on the ABS is offered. For the flexure member in the above magnetic head supporting mechanism, there are two structures, that is, a pivot structure wherein a slider bearing member has a predetermined pivot which supports a slider at a point and a pivotless structure wherein a flexure member and a load beam are integrally molded to eliminate the need to provide a pivot and to support a slider by the face.

The pivot structure, which has excellent slider bearing rigidity, has hitherto been mainly used. The advance of a reduction in size of the magnetic disk storage and an increase in access speed, however, has lead to a tendency that the flexure member having the pivotless structure, which is excellent in convenience for assembling the magnetic head supporting mechanism into between a plurality of magnetic disks, as well as in dynamic vibration properties during operation of the magnetic disk storage, is also extensively used.

Further, in consideration of mounting of an MR (magneto resistive) head capable of coping with high TPI (track per inch) and other matters, for example, a suspension integral with wiring has also been proposed which comprises a plurality of signal wires formed as a thin layer on the surface of a load beam. In the suspension integral with wiring, a flexure member and the load beam should be integral with each other for reasons of patterning. Therefore, the pivotless structure is adopted also in the suspension integral with wiring.

When an HGA (head gimbal assembly) is incorporated into a magnetic disk storage wherein a plurality of magnetic disks (recording media) are stacked on top of each other or one another, a mounting method has been used which comprises: applying a specialty magnetic head insertion jig (an assembly jig) to a magnetic head assembly comprising a plurality of magnetic head supporting mechanisms with the flexure being regulated by a predetermined clamp jig or the like; further flexing the load beam to release the clamp jig; transferring, in this state, the magnetic head onto magnetic disk; and removing the magnetic head insertion jig to release the flexure of the load beam and incorporating the slider loaded with a magnetic head onto the magnetic disk.

At the present time, however, a demand for improved mounting density of the magnetic disk per se and reduced size of the magnetic disk storage has lead to narrowed spacing between magnetic disks. This in turn results in unsatisfactory lift clearance of the load beam, making it difficult to incorporate the magnetic head onto the magnetic disk. For the above mounting of the magnetic head between the narrow space between the magnetic disks, a magnetic head insertion method is required which enables the magnetic head to be mounted onto the magnetic disk in the simplest possible manner in the smallest possible space.

The above conventional techniques, however, had the following drawbacks. Specifically, in the case of the magnetic head supporting mechanism loaded with a flexure member having a pivotless structure, the slider-pressing load is applied through the flexure member rather than through the pivot. Therefore, application of a large pressing load often creates a load loss (escape of load) due to the deformation of the flexure member per se. For this reason, a light pressing load design is required particularly of the magnet head supporting mechanism having a pivotless structure, with the flexure member and the load beam being provided integrally with each other, which is used in a suspension integral with wiring and the like.

More specifically, the conventional magnetic head supporting mechanism having a pivot structure is designed so that the pressing load is about 3.5 to 5.0 gf, whereas the suspension integral with wiring (pivotless structure) is currently designed so that the pressing load is about 0.5 to 1.0 gf. The above light load design for the magnetic head supporting mechanism is an important technique associated with a design for a reduction in size of the slider for increasing the recording density of the magnetic disk and a demand for a small floating height.

Specifically, although a reduced slider-pressing load creates an advantage of an improvement in magnetic disk floating properties, it also creates disadvantages such as lowered air layer rigidity and lowered acceleration of breakoff of the medium. More specifically, the lowered air layer rigidity leads to a deteriorated capability of the slider to follow up the movement of the magnetic disk, and the lowered acceleration of breakoff of the medium deteriorates the impact resistance at the time of stopping of the storhe.

At the present time, by virtue of the development of a negative pressure type slider, the problem involved in the lowered air layer rigidity is being solved. However, as expressed by the following equation (1), the medium breakoff acceleration is proportional to the pressing load of the slider, making it difficult to provide a light load design, for a highly impact-resistant magnetic head supporting mechanism, according to the conventional technique.

$$Acc=F/(M+m) \quad \quad 1)$$

wherein

Acc represents medium breakoff acceleration;

F represents slider-pressing load;

M represents equivalent mass of magnetic head supporting mechanism; and m represents mass of slider.

On the other hand, in order to realize a high recording density of not less than 10 Gb/in$^2$ in a magnetic disk, contact type sliders, such as near contact sliders and contact sliders, has also been developed. In the near contact slider, the floating height of the slider is limited to the glide height level (about 20 nm) to improve data reading properties.

In the case of the near contact slider, however, as described above, the floating height is very small, while the floating of the slider is unsteady. This causes the slider to come into contact with the recording medium in the case of a certain track position of the magnetic disk and a certain yaw angle. For this reason, in order to prevent the breaking of the magnetic head by collision with or sliding on the recording medium or to prevent recorded data from becoming thermally unstable by contact friction, the near contact slider should be designed so that the pressing load is much lower than that in the conventional floating type magnetic head slider.

Also in the case of the contact slider wherein data are recorded or reproduced in such a manner that the magnetic head is always slid in contact with the magnetic disk (recording medium), an ultra-low load design (up to several tens of mgf) is required for reducing the abrasion loss without sacrificing stable contact follow-up of the magnetic head. In a magnetic head supporting mechanism loaded with the above contact slider (contact suspension), a lowering in medium breakoff acceleration due to a light load design significantly deteriorates the impact resistance of the magnetic disk storage.

SUMMARY OF THE INVENTION

Accordingly, an object of the present invention is to provide a magnetic head supporting mechanism which can ensure satisfactory impact resistance and in addition can ensure satisfactory slider supporting rigidity, and a method for assembling a magnetic disk storage comprising the same.

According to the first feature of the invention, a magnetic head supporting mechanism comprises: a rectangular slider bearing member for bearing a slider loaded with a magnetic head; a flexure member, provided so as to surround the slider bearing member, for supporting the slider bearing member in its one end section in the longitudinal direction thereof through a joining site; and a long load beam sheet, provided so as to surround the flexure member, for supporting the flexure member through a predetermined holding site, the joining site, provided between the slider bearing member and the flexure member, having spring properties, the slider bearing member being inclined to the load beam.

According to the second feature of the invention, a method for assembling a magnetic disk storage comprises the steps of: providing a magnetic head supporting mechanism comprising a rectangular slider bearing member for bearing a slider loaded with a magnetic head, a flexure member, provided so as to surround the slider bearing member, for supporting the slider bearing member in its one end section in the longitudinal direction thereof through a joining site, and a long load beam sheet, provided so as to surround the flexure member, for supporting the flexure member through a predetermined holding site, the joining site, provided between the slider bearing member and the flexure member, having spring properties, the slider bearing member being inclined to the load beam; and installing the magnetic head supporting mechanism between a plurality of magnetic disks in such a manner that the slider bearing member is pressed to suppress the inclination of the slider bearing member, permitting the slider bearing member to be on substantially the same plane as the load beam and, thereafter, the magnetic head supporting mechanism is inserted between the magnetic disks.

BRIEF DESCRIPTION OF THE DRAWINGS

The invention will be explained in more detail in conjunction with the appended drawings, wherein:

FIGS. 5A and 5B are diagrams showing a further conventional high-rigidity magnetic head supporting mechanism, wherein FIG. 5A is a plan view and FIG. 5B is a side view;

FIGS. 7A and 7B are side views of a conventional magnetic head supporting mechanism, wherein FIG. 7A shows an unloaded state and FIG. 7B shows a loaded state;

FIGS. 8A and 8B are perspective views of conventional load beams, wherein FIG. 8A shows a pivot type and FIG. 8B shows a pivotless type;

FIGS. 9A and 9B are perspective views of a conventional magnetic head supporting mechanism integral with wiring, wherein FIG. 9A shows a slider-unloaded side and FIG. 9B shows a slider-loaded side;

FIGS. 10A to 10C are diagrams showing a conventional contact type magnetic head supporting mechanism, wherein FIG. 10A is a plan view of the magnetic head supporting mechanism, FIG. 10B is a plan view of a contact slider, and FIG. 10C is a side view of the magnetic head supporting mechanism;

FIGS. 12A and 12B are side views of the magnetic head supporting mechanism shown in FIG. 11, wherein FIG. 12A shows an unloaded state and FIG. 12B shows a loaded state;

FIGS. 14A and 14B are perspective views showing the magnetic head supporting mechanism, shown in FIG. 13, in its slider region, wherein FIG. 14A shows an unloaded state and FIG. 14B shows a loaded state;

FIGS. 15A and 15B are plan views of a magnetic head supporting mechanism integral with wiring, wherein FIG. 15A is a general view and FIG. 15B shows a region a major part of which is occupied by a slider;

FIGS. 16A to 16D are diagrams showing a first variant of the present invention, wherein FIG. 16A is a plan view, FIG. 16B is a side view, FIG. 16C is a plan view showing a region a major part of which is occupied by a slider, and FIG. 16D is a cross-sectional view taken on line A—A of FIG. 16C;

FIGS. 17A to 17C are diagrams showing a second variant of the present invention, wherein FIG. 17A is a plan view, FIG. 17B is a side view, and FIG. 17C is a plan view showing a region a major part of which is occupied by a slider;

FIGS. 18A to 18C are diagrams showing a third variant of the present invention, wherein FIG. 18A is a plan view, FIG. 18B is a side view, and FIG. 18C is a plan view showing a region a major part of which is occupied by a slider;

FIGS. 20A and 20B are side views of the magnetic head supporting mechanism shown in FIG. 19, wherein FIG. 20A shows an unloaded state and FIG. 20B shows a loaded state;

FIGS. 21A to 21D are diagrams showing a fourth variant of the present invention, wherein FIG. 21A is a plan view, FIG. 21B shows a side view, FIG. 21C is a plan view showing a region a major part of which is occupied by a slider, and FIG. 21D is a cross-sectional view taken on line B—B of FIG. 21C;

FIGS. 22A to 22C are diagrams showing a fifth variant of the present invention, wherein FIG. 22A is a plan view, FIG. 22B is a side view, and FIG. 22C is a plan view showing a region a major part of which is occupied by a slider;

FIGS. 23A to 23C are diagrams showing a sixth variant of the present invention, wherein FIG. 23A is a plan view, FIG. 23B is a side view, and FIG. 23C is a plan view showing a region a major part of which is occupied by a slider;

FIGS. 24A to 24C are plan view showing a method for assembling a magnetic disk storhe according to a third preferred embodiment of the present invention, wherein FIG. 24A shows insertion of a magnetic head insertion jig, FIG. 24B shows pressing of a slider bearing member by means of the magnetic head insertion jig, and FIG. 24C shows removal of the magnetic head insertion jig;

FIGS. 25A to 25C are side views showing the method for assembling a magnetic disk storhe shown in FIGS. 24A to 24C, wherein FIG. 25A shows insertion of a magnetic head insertion jig, FIG. 25B shows pressing a slider bearing member by means of the magnetic head insertion jig, and FIG. 25C shows removal of the magnetic head insertion jig; and FIGS. 26A to 26C are diagrams showing a variant of the method for assembling a magnetic disk storhe shown in FIGS. 25A to 25C, wherein FIG. 26A shows insertion of a magnetic head insertion jig, FIG. 26B shows pressing a slider bearing member by means of the magnetic head insertion jig, and FIG. 26C shows removal of the magnetic head insertion jig.

DESCRIPTION OF THE PREFERRED EMBODIMENTS

Before explaining a magnetic head supporting mechanism and a method for assembling a magnetic disk device in the preferred embodiments according to the invention, the aforementioned conventional magnetic head supporting mechanism will be explained in conjunction with FIGS. 1 to 10.

Figure 1:
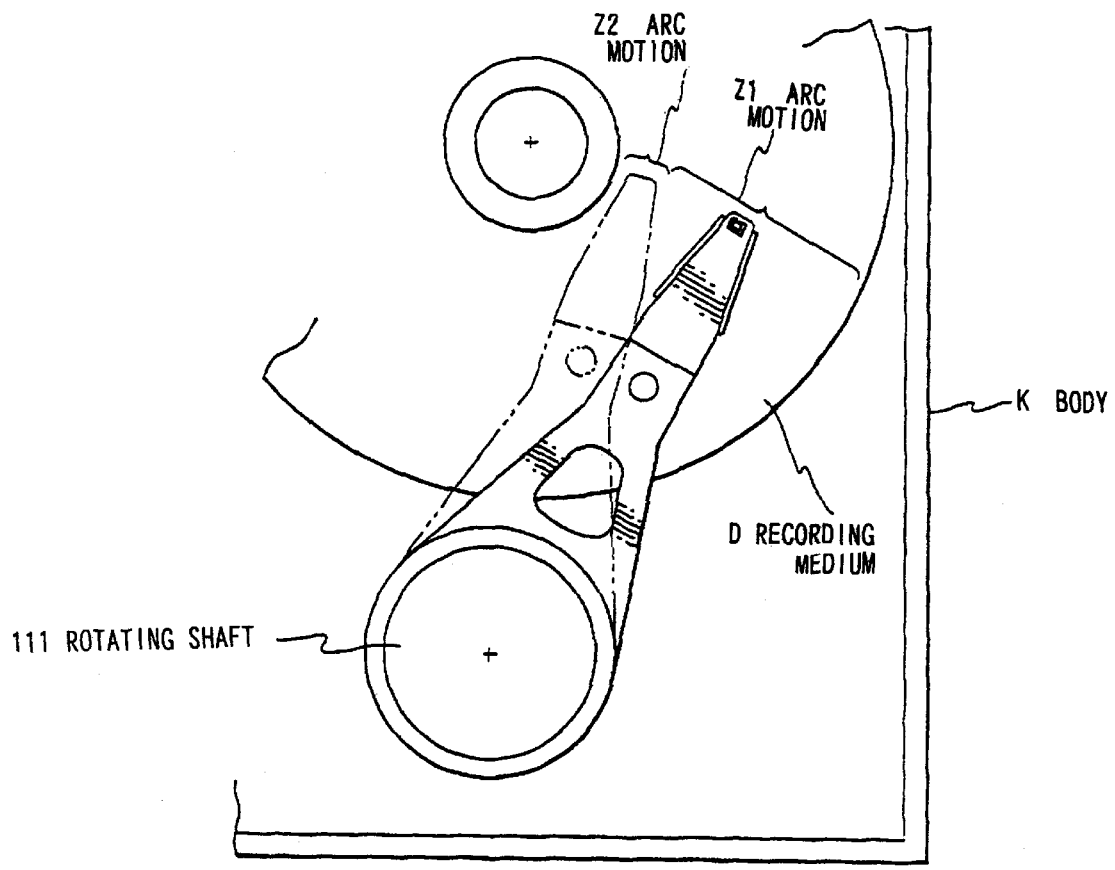
FIG. 1 is a plan view showing a magnetic head supporting mechanism of a rotary actuator system.

FIG. 1 shows an in-line type magnetic head supporting mechanism (in-line type: a magnetic head supporting mechanism wherein the load beam and the slider are provided so that the longitudinal axis of the slider is parallel to the longitudinal axis of the load beam) of a rotary actuator system (a positioner mechanism wherein the magnetic head is moved through arcuate motion of the magnetic head supporting mechanism by a voice coil motor). High rigidity in a direction (seek direction) perpendicular to the longitudinal axis is required of this magnetic head supporting mechanism.

Figure 2:
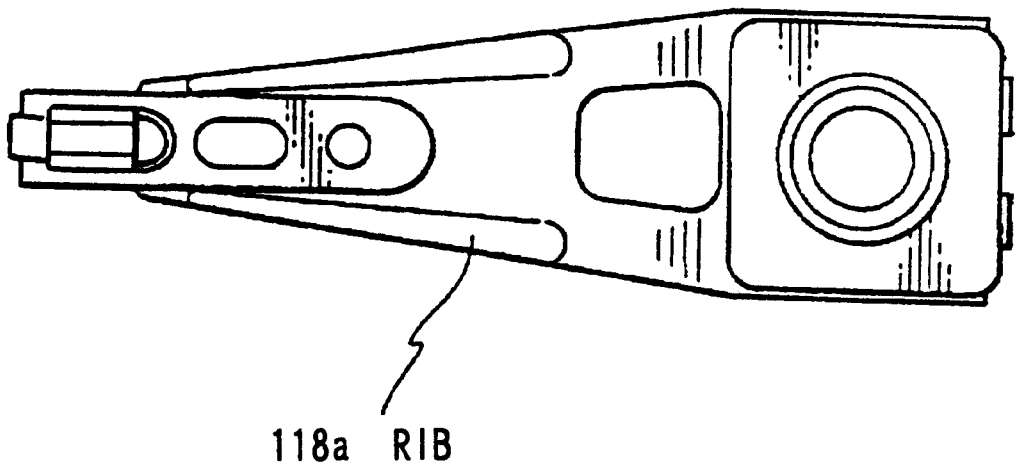
FIG. 2 is a diagram showing a conventional high-rigidity magnetic head supporting mechanism.
Figure 3:
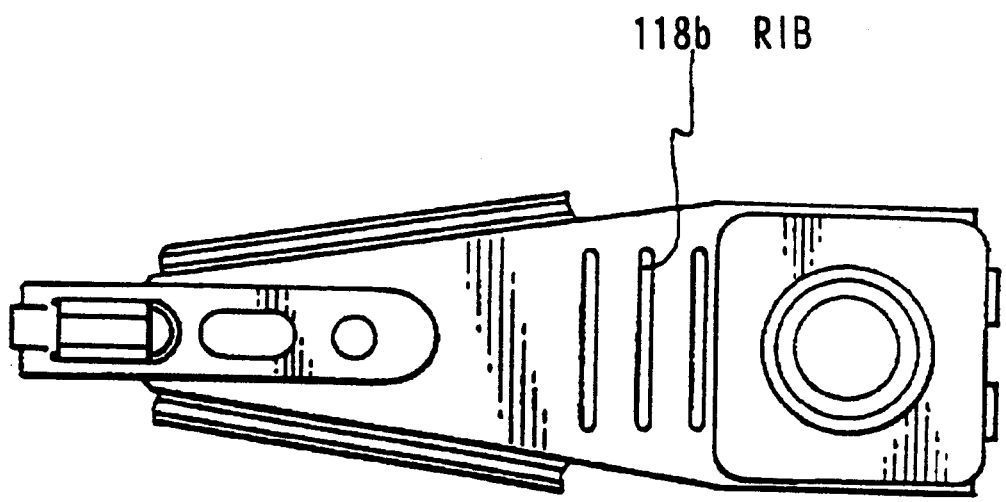
FIG. 3 is a diagram showing another conventional high-rigidity magnetic head supporting mechanism.
Figure 4:
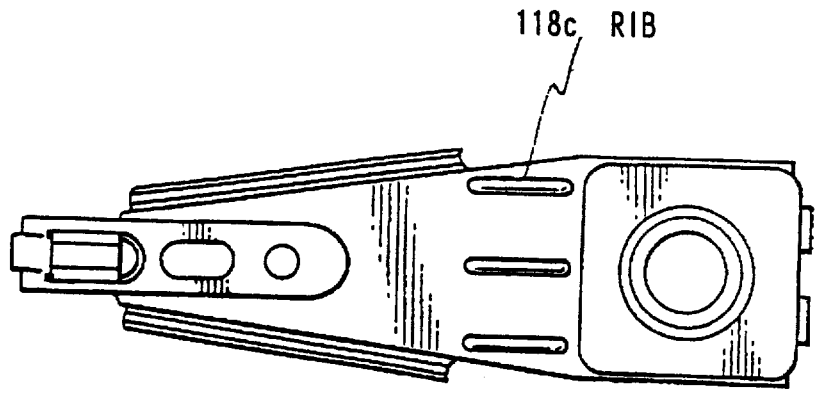
FIG. 4 is a diagram showing still another conventional high-rigidity magnetic head supporting mechanism.
Figure 5A:
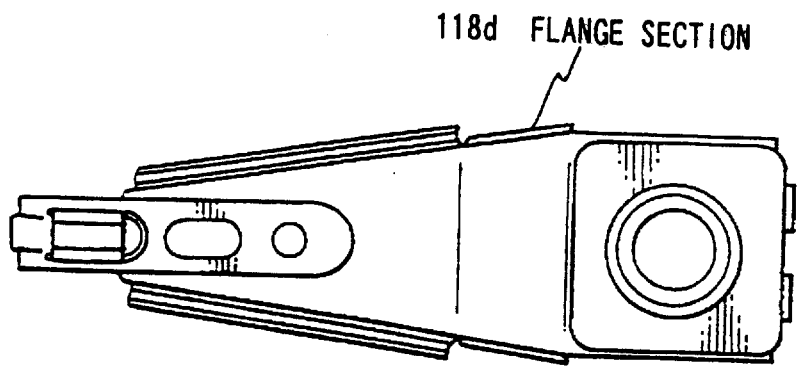
Figure 5B:
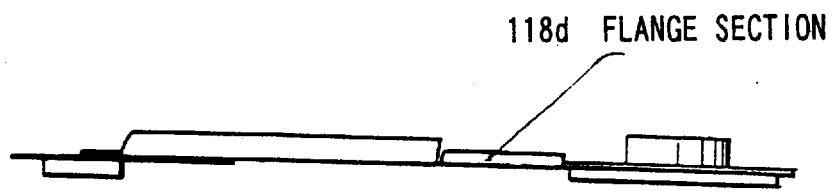

Prior art techniques, wherein the load beam per se is improved in rigidity and strengthened to improve the vibration properties, include one wherein a rib 118$a$ is applied to the middle position of the load beam excluding a loading, bent section for applying a pressing load to the slider (FIG. 2; Japanese Patent Laid-Open No. 28801/1994), one wherein ribs 118$b$, 118$c$ are applied to the loading, bent section (FIGS. 3 and 4; Japanese Patent Laid-Open No. 222472/1987), and one wherein a flange section 118$d$ is provided also on both the right and left sides of the loading, bent section (FIGS. 5A and 5B; Japanese Patent Laid-Open No. 222472/1987).

Figure 6:
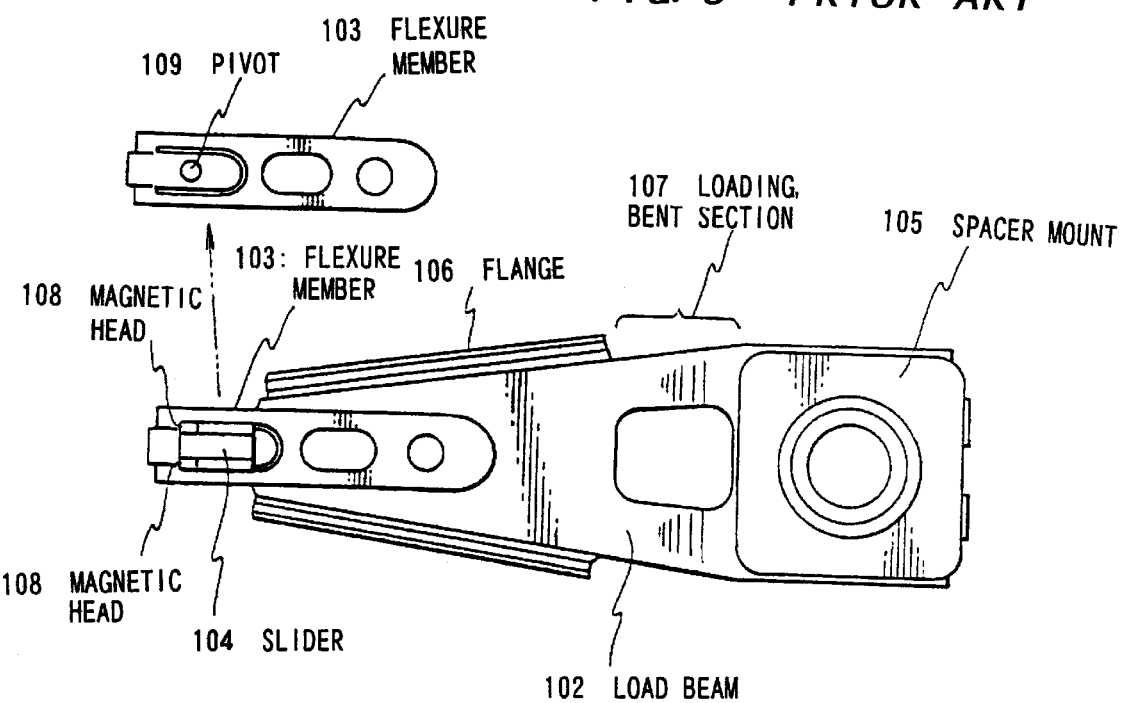
FIG. 6 is a plan view of a conventional in-line type magnetic head supporting mechanism.

An example of the conventional in-line type magnetic head supporting mechanism is shown in FIG. 6. In the drawing, numeral 102 designates a load beam, numeral 103 a flexure member, numeral 104 a slider, numeral 105 a spacer mount, numeral 106 a flange, numeral 107 a loading, bent section, numeral 108 a magnetic head, and numeral 109 a pivot.

Figure 7A:
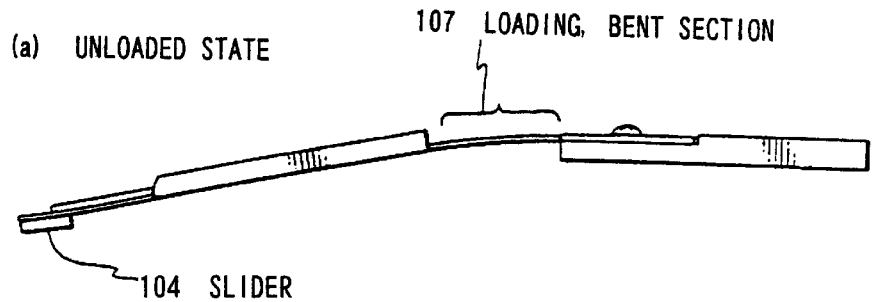
Figure 7B:
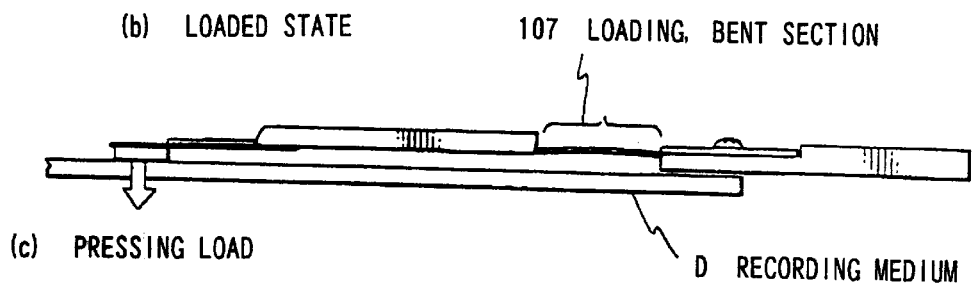

In the spacer mount 105, this magnetic head supporting mechanism is connected to a positioner mechanism (not shown) to carry out positioning on a required track of a magnetic disk (see FIG. 1). As shown in FIG. 7A, the loading, bent section 107 in the load beam 102 has been plastically deformed and is constructed so that, when the slider 104 is incorporated into the magnetic disk (recording medium D), a predetermined pressing load is applied to the slider 104 (see FIG. 7B).

Figure 8A:
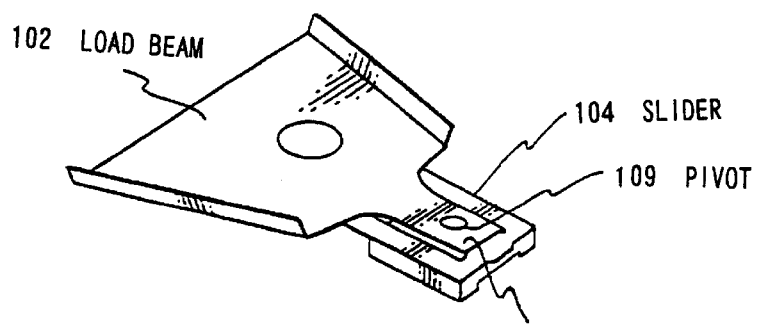
Figure 8B:
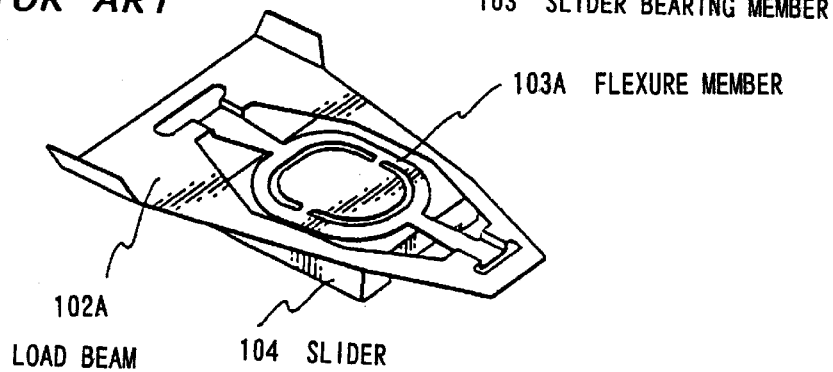

The slider 104 floats over the magnetic disk (recording medium) at a position where a balance between the pressing load and the buoyancy created by the air viscous flow on the ABS is offered. For the flexure member 103 in the above magnetic head supporting mechanism, there are two structures, that is, a pivot structure, as shown in FIG. 8A, wherein a slider bearing member 103 has a predetermined pivot 109 which supports a slider 104 at a point and a pivotless structure, as shown in FIG. 8B, wherein a flexure member 103A and a load beam 102A are integrally molded to eliminate the need to provide a pivot and to support a slider 104 by the face.

The pivot structure, which has excellent slider bearing rigidity, has hitherto been mainly used. The advance of a reduction in size of the magnetic disk storage and an increase in access speed, however, has lead to a tendency that the flexure member having the pivotless structure, which is excellent in convenience for assembling the magnetic head supporting mechanism into between a plurality of magnetic disks, as well as in dynamic vibration properties during operation of the magnetic disk storage, is also extensively used.

Figure 9A:
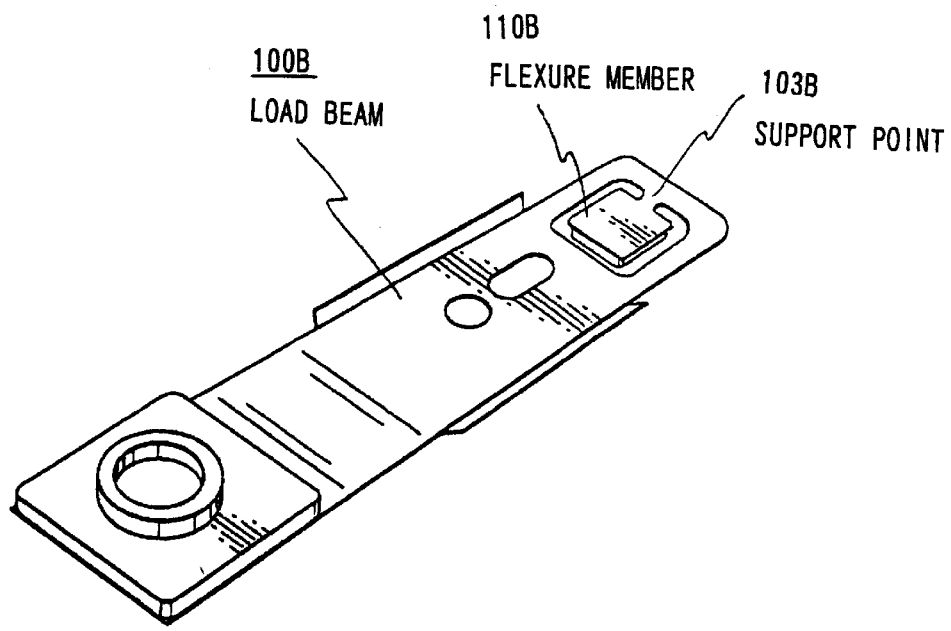
Figure 9B:
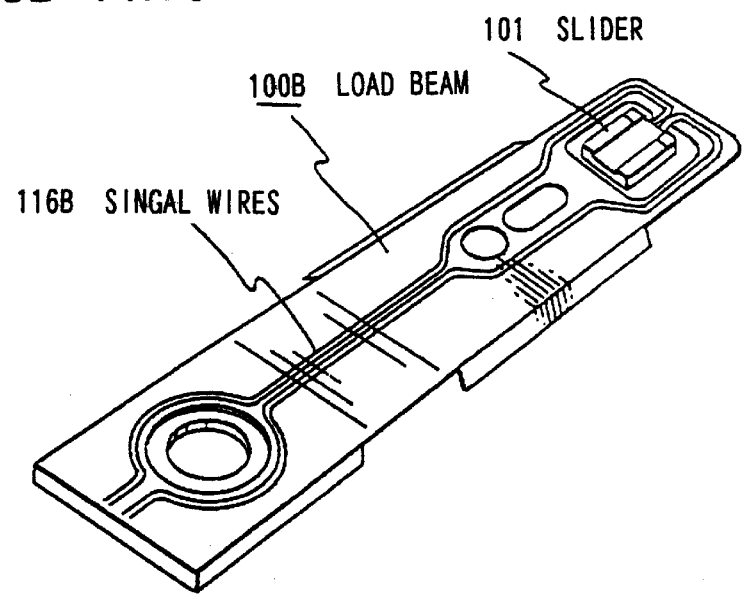

Further, in consideration of mounting of an MR (magneto resistive) head capable of coping with high TPI (track per inch) and other matters, for example, a suspension integral with wiring as shown in FIGS. 9A and 9B has also been proposed which comprises a plurality of signal wires 116B formed as a thin layer on the surface of a load beam 100B. In the suspension integral with wiring, a flexure member 110B and the load beam 100B should be integral with each other for reasons of patterning. Therefore, the pivotless structure is adopted also in the suspension integral with wiring.

When HGA (head gimbal assembly) is incorporated into a magnetic disk storage wherein a plurality of magnetic disks (recording media) are stacked on top of each other or one another, a mounting method has been used which comprises: applying a specialty magnetic head insertion jig (an assembly jig) to a magnetic head assembly comprising a plurality of magnetic head supporting mechanisms with the flexure being regulated by a predetermined clamp jig or the like; further flexing the load beam to release the clamp jig; transferring, in this state, the magnetic head onto magnetic disk; and removing the magnetic head insertion jig to release the flexure of the load beam and incorporating the slider loaded with a magnetic head onto the magnetic disk.

At the present time, however, a demand for improved mounting density of the magnetic disk per se and reduced size of the magnetic disk storhe has lead to narrowed spacing between magnetic disks. This in turn results in unsatisfactory lift clearance of the load beam, making it difficult to incorporate the magnetic head onto the magnetic disk. For the above mounting of the magnetic head between the narrow space between the magnetic disks, a magnetic head insertion method is required which enables the magnetic head to be mounted onto the magnetic disk in the simplest possible manner in the smallest possible space.

The above conventional techniques, however, had the following drawbacks. Specifically, in the case of the magnetic head supporting mechanism provided with a flexure member having a pivotless structure, the slider-pressing load is applied through the flexure member rather than through the pivot. Therefore, application of a large pressing load often creates a load loss (escape of load) due to the deformation of the flexure member per se. For this reason, a light pressing load design is required particularly of the magnet head supporting mechanism having a pivotless structure, with the flexure member and the load beam being provided integrally with each other, which is used in a suspension integral with wiring, as shown in FIGS. 9A and 9B, and the like.

More specifically, the conventional magnetic head supporting mechanism having a pivot structure is designed so that the pressing load is about 3.5 to 5.0 gf, whereas the suspension integral with wiring (pivotless structure) is currently designed so that the pressing load is about 0.5 to 1.0 gf. The above light load design for the magnetic head supporting mechanism is an important technique associated with a design for a reduction in size of the slider for increasing the recording density of the magnetic disk and a demand for a small floating height.

Specifically, although a reduced slider-pressing load creates an advantage of an improvement in magnetic disk floating properties, it also creates disadvantages such as lowered air layer rigidity and lowered acceleration of breakoff of the medium. More specifically, the lowered air layer rigidity leads to a deteriorated capability of the slider to follow up the movement of the magnetic disk, and the lowered acceleration of breakoff of the medium deteriorates the impact resistance at the time of stopping of the storhe.

At the present time, by virtue of the development of a negative pressure type slider, the problem involved in the lowered air layer rigidity is being solved. However, as expressed by the following equation (1), the medium breakoff acceleration is proportional to the pressing load of the slider, making it difficult to provide a light load design, for a highly impact-resistant magnetic head supporting mechanism, according to the conventional technique.

$$Acc = F/(M+m) \tag{1}$$

wherein

Acc represents medium breakoff acceleration;

F represents slider-pressing load;

M represents equivalent mass of magnetic head supporting mechanism; and m represents mass of slider.

On the other hand, in order to realize a high recording density of not less than 10 Gb/in$^2$ in a magnetic disk, contact type sliders, such as near contact sliders and contact sliders, has also been developed. In the near contact slider, the floating height of the slider is limited to the glide height level (about 20 nm) to improve data reading properties.

In the case of the near contact slider, however, as described above, the floating height is very small, while the floating of the slider is unsteady. This causes the slider to come into contact with the recording medium in the case of a certain track position of the magnetic disk and a certain yaw angle. For this reason, in order to prevent the breaking of the magnetic head by collision with or sliding on the recording medium or to prevent recorded data from becoming thermally unstable by contact friction, the near contact slider should be designed so that the pressing load is much lower than that in the conventional floating type magnetic head slider.

Also in the case of the contact slider wherein data are recorded or reproduced in such a manner that the magnetic head is always slid in contact with the magnetic disk (recording medium), a ultra-low load design (up to several tens of mgf) is required for reducing the abrasion loss without sacrificing stable contact follow-up of the magnetic head. In a magnetic head supporting mechanism loaded with the above contact type slider (contact suspension; see FIGS. 10A, 10B, and 10C), a lowering in medium breakoff acceleration due to a light load design significantly deteriorates the impact resistance of the magnetic disk storhe.

[First preferred embodiment]

Next, the first preferred embodiment of the present invention will be described with reference to FIGS. 11 to 14.

The magnetic head supporting mechanism according to this preferred embodiment comprises: a rectangular slider bearing member 10 for bearing a slider 4 loaded with a magnetic head 8; a flexure member 3, provided so as to surround the slider bearing member 10, for supporting the slider bearing member 10 in its one end section in the longitudinal direction thereof through a joining site 7; and a long load beam sheet 2, provided so as to surround the flexure member 3, for supporting the flexure member 3 through a predetermined holding site (a flexure arm) 11, the joining site 7, provided between the slider bearing member 10 and the flexure member 3, having spring properties, the slider bearing member 10 being inclined to the load beam 2.

This magnetic head supporting mechanism will be described in more detail. The magnetic head supporting mechanism (suspension) according to the first preferred embodiment shown in FIG. 11 comprises: a flexure member 3 for supporting a slider 4 loaded with a magnetic head 8; a load beam 2 for supporting a flexure member 3; and a spacer mount 5 for joining the load beam 2 to the so-called "positioner mechanism" (not shown).

In this case, a pair of U-shaped notch sections 9b (a second U-shaped notch) are provided on the front end section on the slider 4 mounting side (hereinafter referred to as "free end side") of the load beam 2 so that the U-shaped notch sections 9b are symmetrical with respect to the central axis in the longitudinal direction of the load beam 2, surround the slider 4, and face each other. The slider bearing member 10, the flexure member 3, and the load beam 2 are integrally provided to form one thin sheet.

The width of the U-shaped notch section 9b should be not less than about 100 $\mu$m when they are formed by stamping; and should be not less than about 50 $\mu$m when they are formed by wet etching (sheet thickness for both the above cases: about 25 $\mu$m).

The flexure member 3 is held by a flexure arm 11 provided between the flexure member 3 and the load beam 2. More specifically, the flexure member 3 is held to the load beam 2 by one front flexure arm 11 and one rear flexure arm 11 along the longitudinal central axis of the load beam 2. Another U-shaped notch section 9a (a first U-shaped notch section), which is open toward the free end side of the load beam 2, is provided on the central portion of the flexure member 3 in a cocoon form thus formed, thereby forming a rectangular (or a tongue-like) slider bearing member 10 within the flexure member 3. A slider 4 loaded with a magnetic head 8 is adhered onto the central portion of the tongue-like slider bearing member 10. The joining site 7 of the tongue-like slider bearing member 10 has been subjected to predetermined bending and has spring properties. Therefore, as shown in FIGS. 12A and 12B and FIGS. 14A and 14B, the slider bearing member 10 has a predetermined inclination angle to the surface of the load beam 2. Further, the bending tolerates the pitch motion of the slider 4, and the torsion of one front flexure arm 11 and one rear flexure arm 11 for supporting the cocoon-shaped flexure member 3 supports the rolling motion of the slider 4, offering flexible slider supporting rigidity.

In this case, in order to impart satisfactory medium follow-up properties to the slider 4 during the operation of a magnetic disk storhe (not shown), the width of the slider bearing member 10 and the width of the flexure arm 11 should be small to reduce the supporting rigidity against the slider 4. However, when the width of the flexure arm 11 is excessively small, the so-called "seek rigidity" is lowered. The term "seek rigidity" used herein refers to rigidity in the case where the load beam 2 seeks on a magnetic disk (not shown). A flange 6 is continuously provided on both the left and right sides of the load beam 2 from the spacer mount 5 mounting position to the free end, ensuring satisfactory rigidity.

Figure 15A:
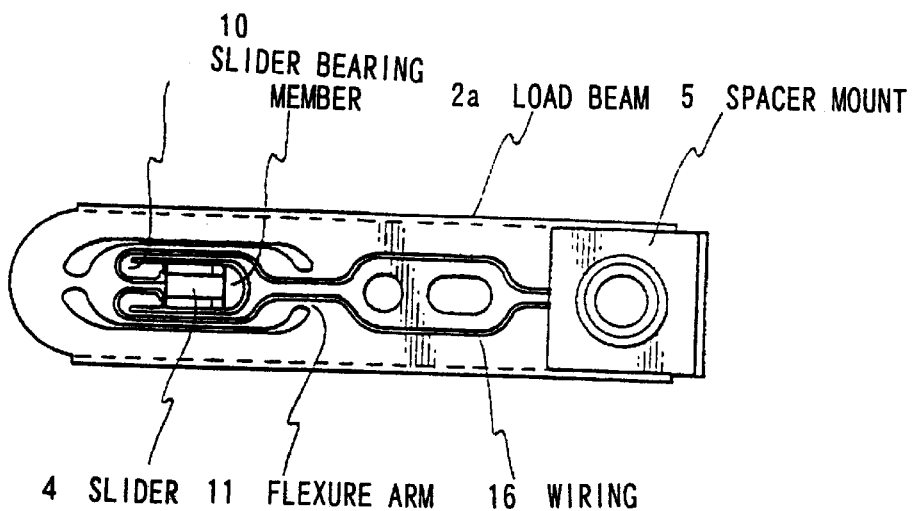
Figure 15B:
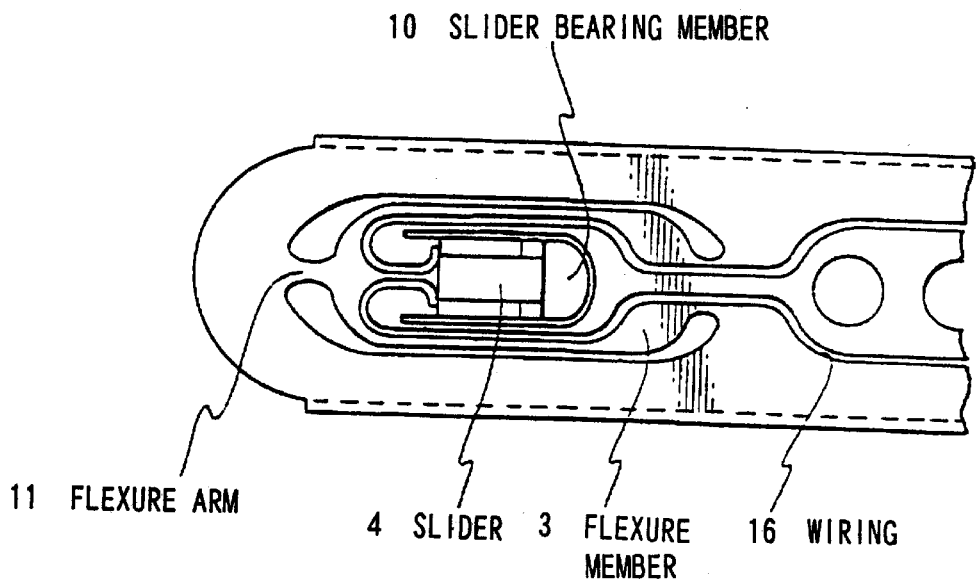
Figure 16A:
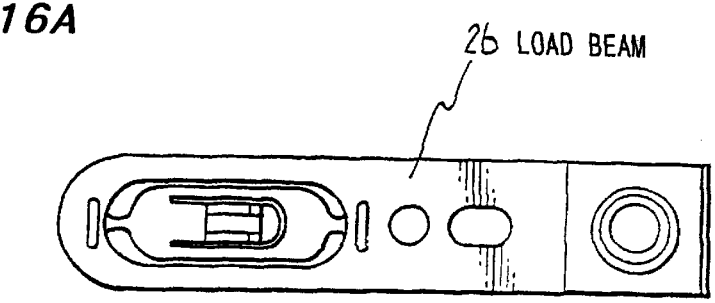
Figure 16B:
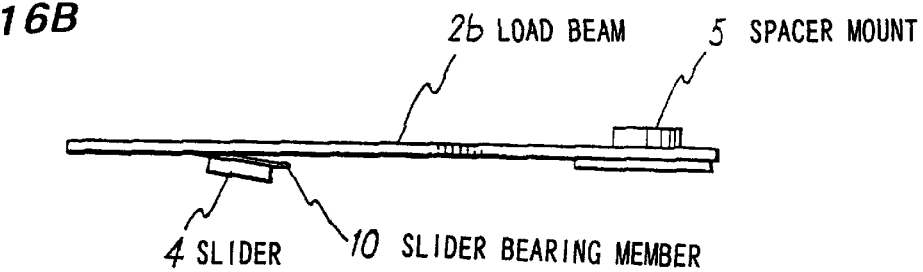
Figure 16C:
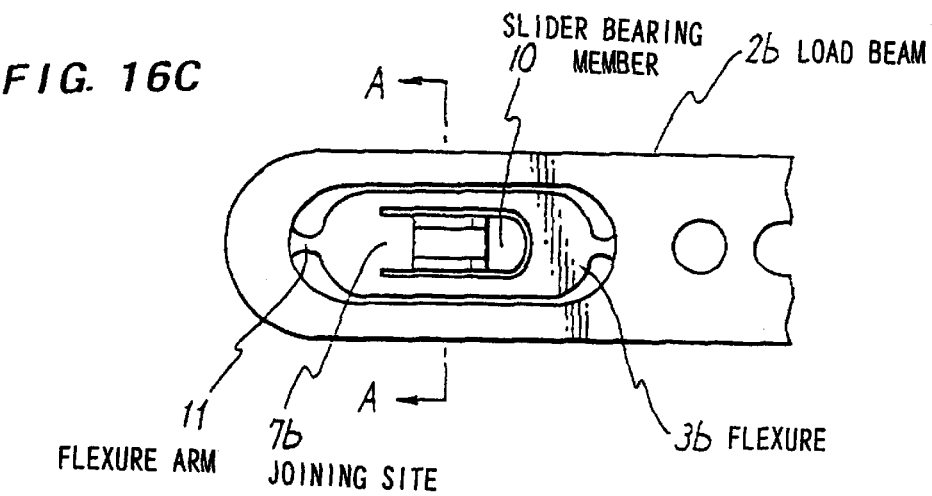
Figure 16D:
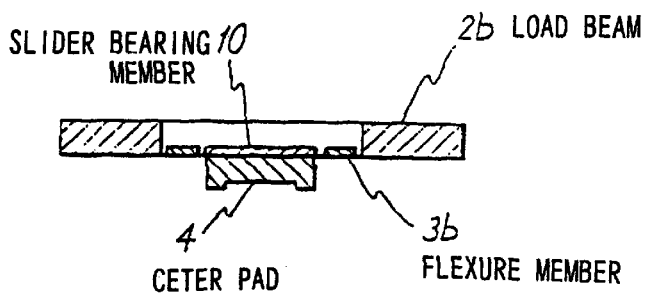

When application to a magnetic head supporting mechanism integral with wiring (a suspension integral with wiring) as shown in FIGS. 15A and 15B, is taken into consideration, for both the flexure arm 11 on the side, through which the wiring 16 is passed, and the joining site 7 of the slider bearing member 10, the width is preferably at least 0.4 mm (in the case of four wires) from the viewpoint of patterning of wiring 16.

Figure 11:
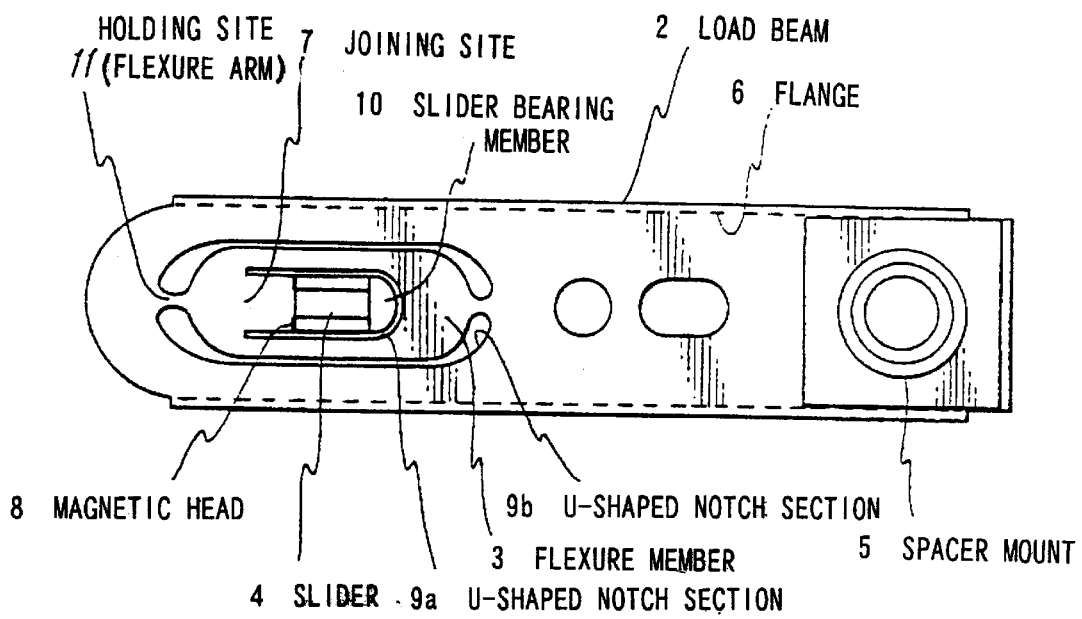
FIG. 11 is a plan view of a magnetic head supporting mechanism according to a first preferred embodiment of the present invention.
Figure 12A:
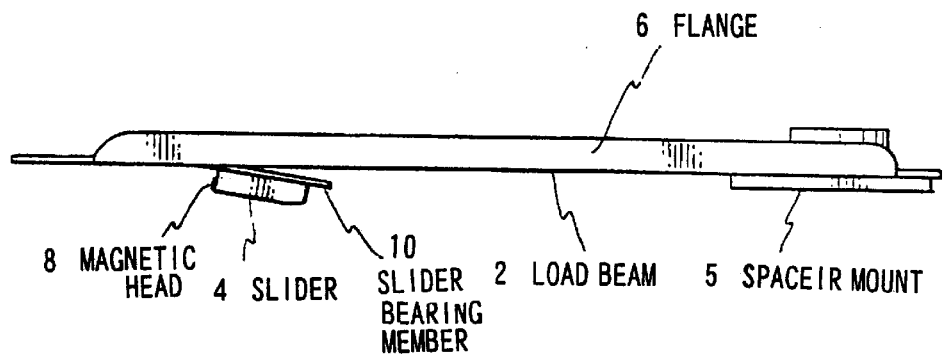
Figure 12B:
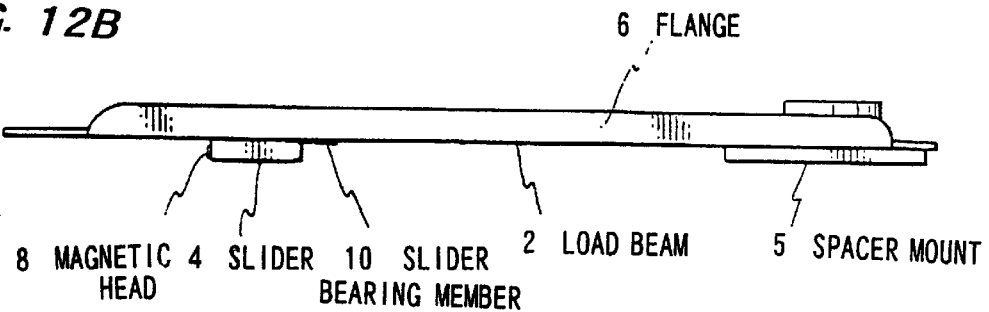
Figure 13:
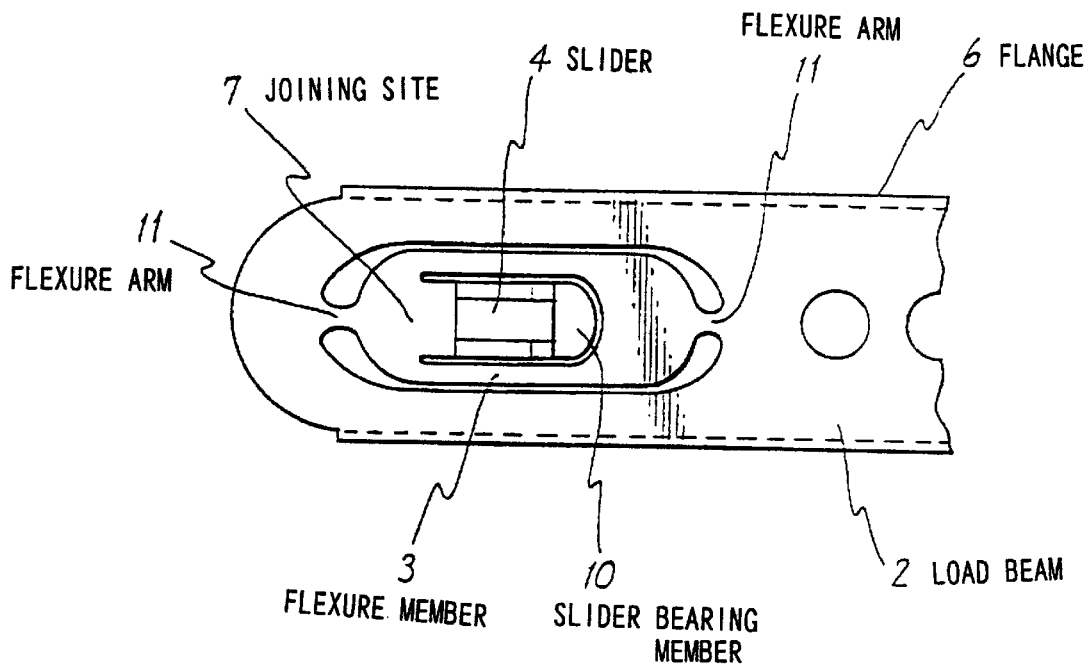
FIG. 13 is a plan view showing the magnetic head supporting mechanism, shown in FIG. 11, in its region a major part of which is occupied by a slider.
Figure 14A:
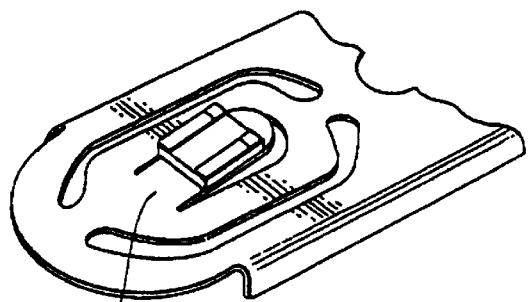
Figure 14B:
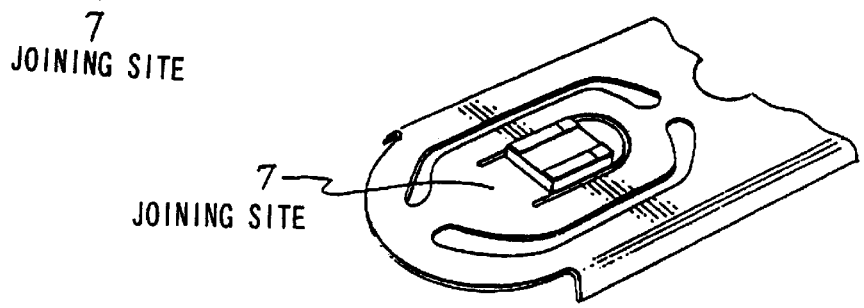

In the present invention, as shown in FIG. 11, a loading, bent section (FIGS. 7A and 7B), which was provided on the spacer mount side (hereinafter referred to as a "fixed end side") of the loaded beam in the prior art, has been eliminated from the load beam 2 and newly provided in the joining site 7 between the flexure member 3 and the slider bearing member 10.

If the slider bearing member 10 and the flexure member 3 are constituted by a 25 $\mu$m-thick stainless steel (SUS 304) sheet, when the width of the joining site 7 is brought to about 30% of the slider width, that is, about 1 mm, the bending angle (flexure angle) of the joining site 7 is approximately about 3 degrees (degree of flexure: about 104 $\mu$m), provided that the pressing load is 1 gf and the distance from the load acting point of the slider 4 to the joining site 7 is 2 mm.

Further, when the width of the joining site 7 of the slider bearing member 10 is reduced to about 0.4 mm in order to provide pitch rigidity for a satisfactorily flexible flexure member 3, the bending angle (flexure angle) of the joining site 7 is about 11.2 degrees (degree of flexure: 260 $\mu$m).

Thus, when the joining site 7 having spring properties is eliminated from the load beam 2 and newly provided between the flexure member 3 and the slider bearing member 10, a design can be made so that the rigidity of the load beam 2 per se can be satisfactorily ensured. Further, in this case, the size of the slider bearing member 10 can be reduced. Therefore, the equivalent mass of the magnetic head supporting mechanism expressed by the equation (1) described in the column of the "BACKGROUND OF THE INVENTION" can be made small, so that, even in the case of a light-load design for the slider, the medium breakoff acceleration can be increased, realizing a design of a magnetic head supporting mechanism having excellent impact resistance.

In this preferred embodiment, the flexure member 3 is symmetrical regarding not only the front and rear sides but also the left and right sides. However, for the two flexure arms 11 for holding the flexure member 3, the length or the arm width on the front side may be made different from the length or the arm width on the rear side, depending upon the optimization design of the slider supporting rigidity and the loading, bent design of the slider bearing member 10. Further, as described above, on both the left and right sides of the load beam 2 is provided a flange 6 from the fixed end side to the free end side of the load beam 2 to enhance the rigidity.

In this case, the loading, bent section, which has been provided on the load beam 2 in the prior art, is completely eliminated, and the load beam 2 is constructed, from the side of the spacer mount 5, to be connected to a positioner mechanism (fixed end side), to the free end side except for the flexure member 3, so as to substantially function as a rigid body. This can eliminate the so-called "bump deformation," which has been regarded as a problem derived from the loading, bent section of the load beam 2, and the cause of a deterioration in vibration properties (mainly an increase in gain of torsional vibration), such as Z-height fluctuation.

Next, variants of the magnetic head supporting mechanism will be described. At the outset, in a first variant shown in FIGS. 16A to 16D, the flange section 6 on both the left and right sides of the load beam 2 in the above preferred embodiment is eliminated, and, instead, the sheet thickness of the load beam 2b is increased to increase the rigidity. On the other hand, a flexure member 3b has been milled to partially reduce the sheet thickness (half etching) to reduce the slider supporting rigidity, ensuring flexibility.

For example, in the case of a short type magnetic head supporting mechanism, wherein the distance between the center of the slider and the center of the spacer mount is about 11 mm, satisfactory load beam rigidity can be provided without providing any flange so far as a sheet thickness of the load beam 2b of not less than 76 $\mu$m is ensured. For the sheet thickness of the flexure member 3b, about 25 $\mu$m in consideration of a variation in etching accuracy can ensure satisfactory flexible slider supporting rigidity. This variant is particularly effective in applications where a thin magnetic head supporting mechanism is required, such as in the case where a plurality of magnetic disks are mounted while leaving a narrow clearance therebetween. When this variant is applied to a suspension integral with wiring, the surface of the load beam remote from the wiring pattern should be subjected to half etching from the viewpoint of avoiding damage to the wiring.

Figure 17A:
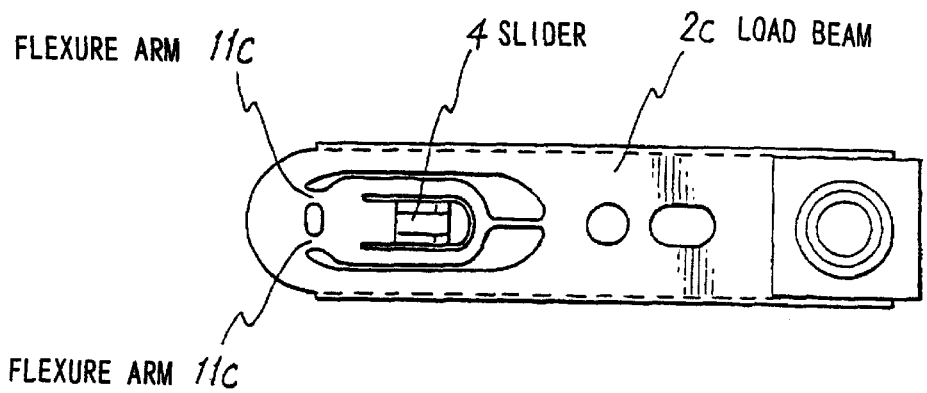
Figure 17B:
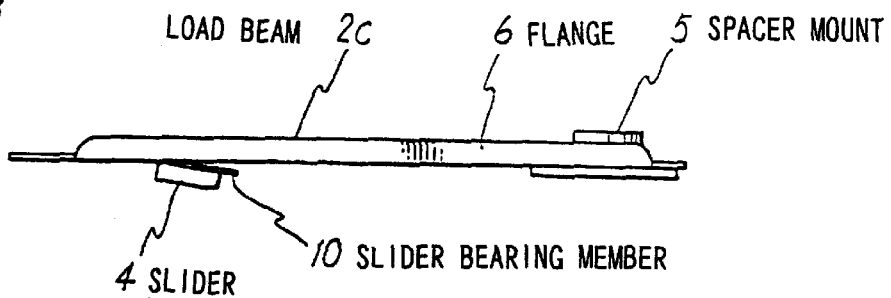
Figure 17C:
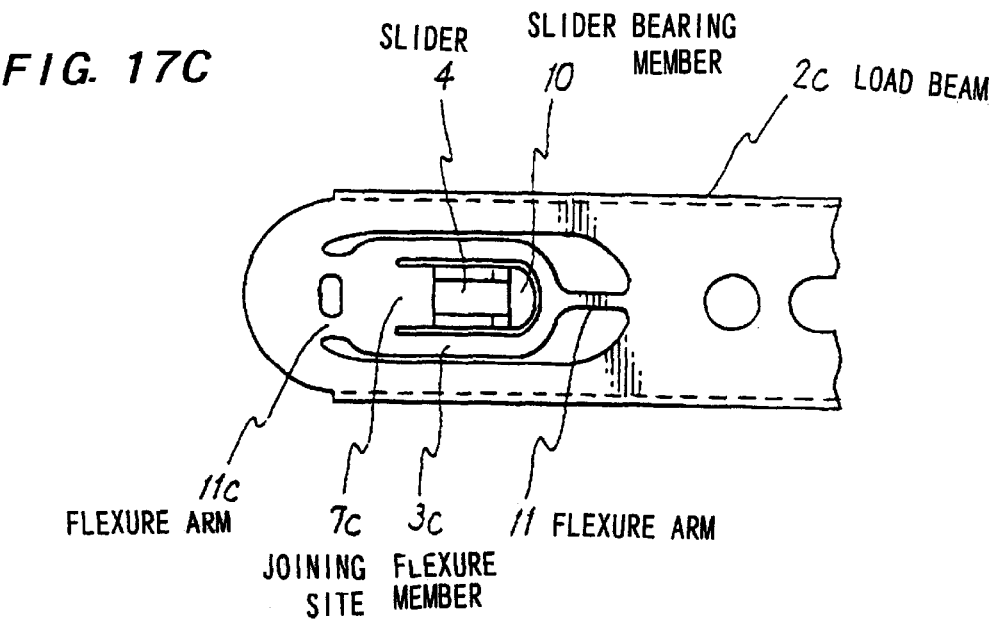

Next, a second variant will be described with reference to FIGS. 17A to 17C. In this variant, the two-point supporting by the flexure arm in the magnetic head supporting mechanism in the above preferred embodiment has been changed to three-point supporting (two points on the free end side of the load beam 2c and one point on the fixed end side of the load beam 2c. According to need, the number of points may be reversed (one point on the free end side and two points on the fixed end side).

This is useful for the magnetic head positioning mechanism for high-speed data access that requires good vibration properties. In this case, although the rolling rigidity of the slider 4 is somewhat increased, satisfactory seek rigidity can be provided.

Figure 18A:
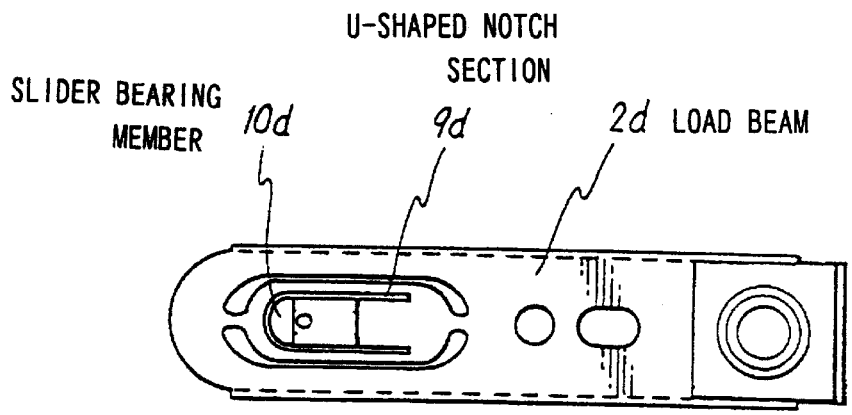
Figure 18B:
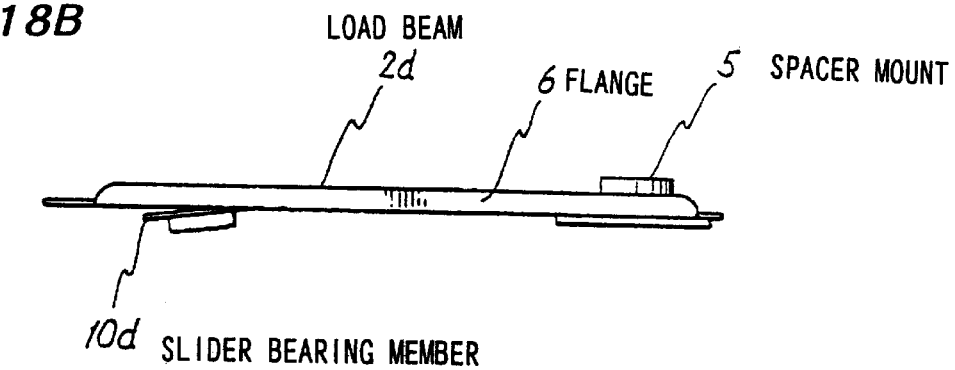
Figure 18C:
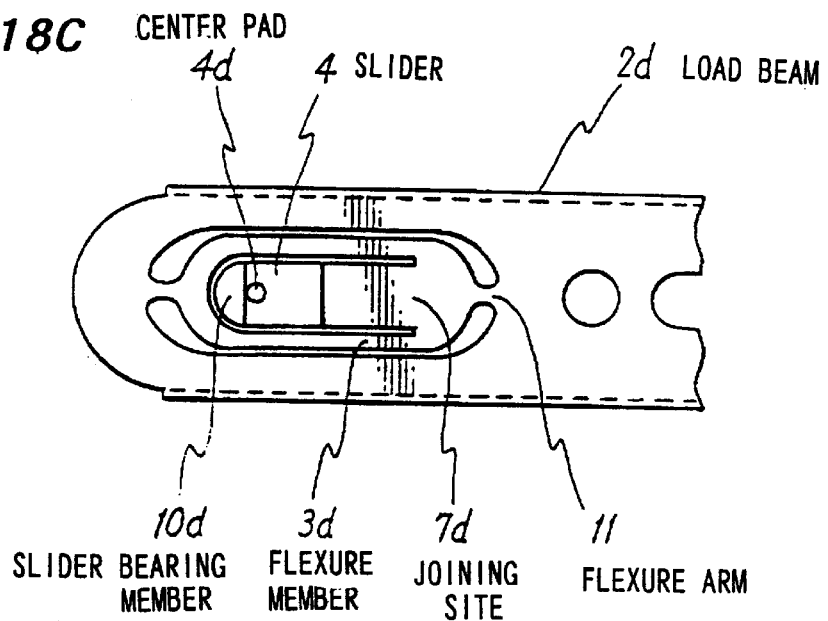

A third variant will be described with reference to FIGS. 18A to 18C. In this variant, the opening of the U-shaped notch section 9d within the flexure member 3d is provided toward the fixed end side of the load beam 2d to reverse the orientation of the slider bearing member 10d, and the joining site 7 having spring properties is provided on the fixed end side. This is mainly used as a contact type slider magnetic head supporting mechanism, and the direction of the moment of the pressing load is made identical to the sliding direction so that the center pad 4d on the magnetic head mounting side always stably comes into contact with the recording medium.

[Second preferred embodiment]

The magnetic head supporting mechanism according to the second preferred embodiment of the present invention will be described.

Figure 19:
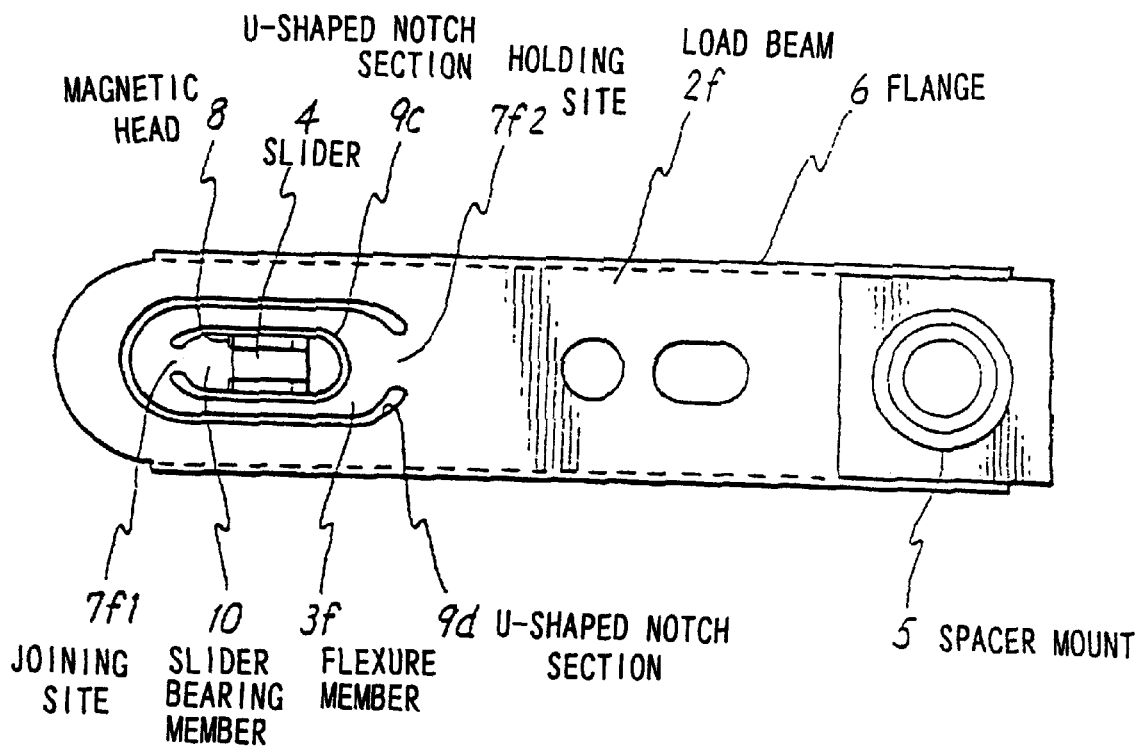
FIG. 19 is a plan view showing a magnetic head supporting mechanism according to a second preferred embodiment of the present invention.
Figure 21A:
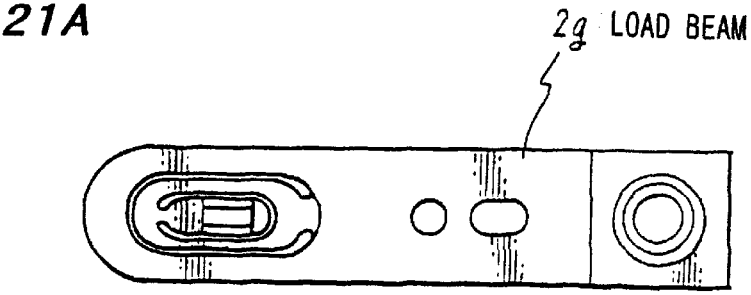
Figure 21B:
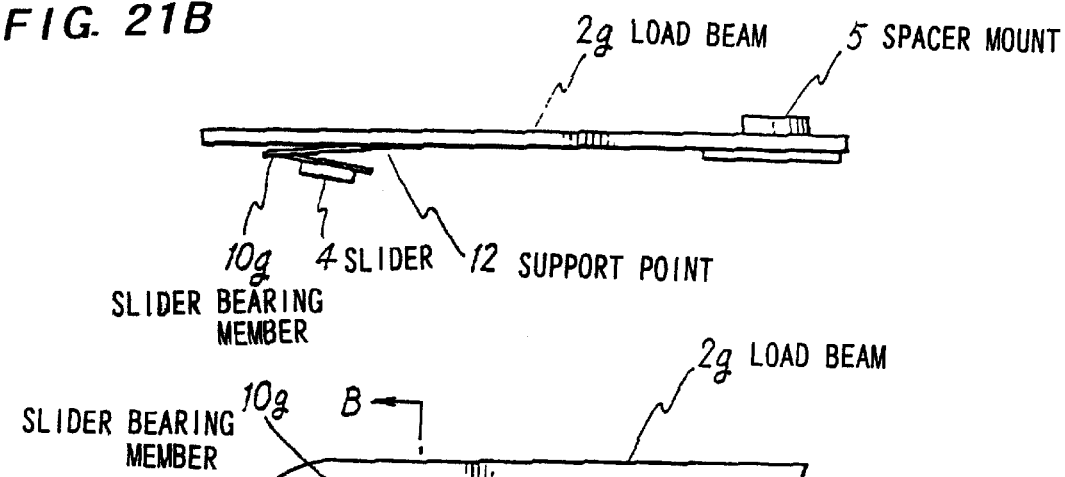
Figure 21C:
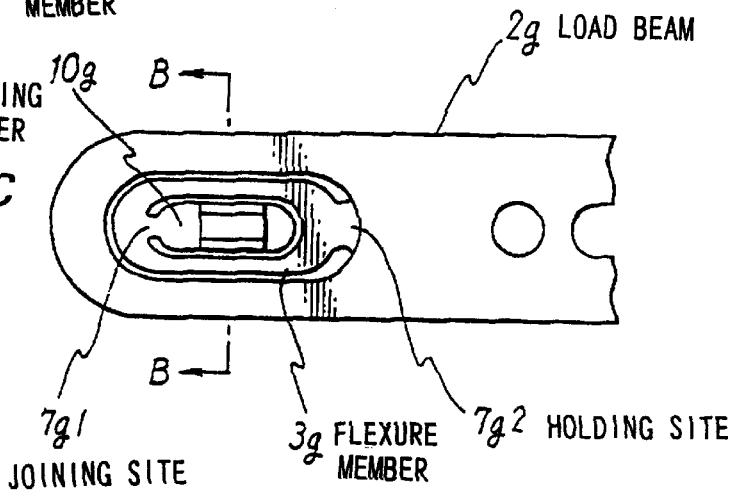
Figure 21D:
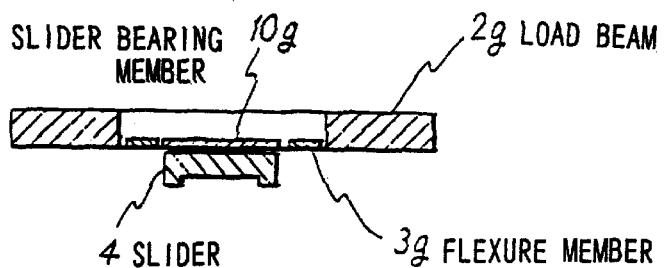

FIG. 19 and FIGS. 20A and 20B are respectively a plan view and side views showing the second preferred embodiment of the present invention. As shown in the drawings, in the magnetic head supporting mechanism according to this preferred embodiment, a first U-shaped notch section 9c is provided between the slider bearing member 10 and the flexure member 3f so as to surround the slider 4. Further, a second U-shaped notch section 9d is provided between the flexure member 3f and the load beam 2f so as to surround the flexure member 3f. The joining site 7f1 between the slider bearing member 10 and the flexure member 3f is provided on one end section side in the longitudinal direction of the load beam 2f. The holding site 7f2 between the flexure member 3f and the load beam 2f is provided on the other end section side in the longitudinal direction of the load beam 2f, and both the joining site 7f1 and the holding site 7f2 have spring properties. The remaining parts are the same as that of the first preferred embodiment.

This preferred embodiment will be described in more detail. In the magnetic head supporting mechanism according to this preferred embodiment, as shown in FIG. 19, an opening of a U-shaped notch section 9d is provided on the free end area of the load beam 2f so as to face the fixed end side to constitute a tongue-like (or a rectangular) flexure member 3f. Further, a U-shaped notch section 9c, which is one size smaller than the U-shaped notch section 9d, is provided in the central portion of the flexure member 3f so that the opening faces the free end side of the load beam 2f to constitute a tongue-like slider bearing member 10. The portion between the load beam 2f and the flexure member 3f serves as a holding site 7f2 having spring properties, and the portion between the flexure member 3f and the slider bearing member 10 serves as a joining site 7f1 having spring properties. Therefore, when no pressing load is applied to the slider 4, as shown in FIG. 20A, the slider 4 is inclined to and hence is not on the same plane as the load beam 2f. On the other hand, when the slider 4 is incorporated into a magnetic disk storage (not shown) and brought into contact with a magnetic disk, as shown in FIG. 20B, the slider bearing member 10 is on substantially the same plane as the load beam 2f. The joining site 7f1 and the holding site 7f2 are constructed so that both have spring properties.

Thus, the tongue-like slider bearing member 10 and the tongue-like flexure member 3f and the load beam 2f involving it are integrally molded using a single steel sheet. The slider 4 loaded with the magnetic head 8 is adhered to the central portion of the tongue-like slider bearing member 10. The roll motion and pitch motion of the slider 4 are properly supported by bending and torsion tolerated by the joining site 7f1 between the slider bearing member 10 and the flexure member 3f and the holding site 7f2 between the flexure member 3f and the load beam 2f, offering flexible slider supporting rigidity.

In this case, in order to impart satisfactory medium follow-up properties to the slider 4, the width of the narrow portion of the joining site 7f1 between the slider bearing member 10 and the flexure member 3f should be reduced to lower the slider supporting rigidity. When application to a suspension integral with wiring is contemplated, as with the first preferred embodiment, the width may be not less than 0.4 mm for both the joining site 7f1 and the holding site 7f2.

On the other hand, as with the first preferred embodiment, a flange 6 is continuously provided on both the left and right sides of the load beam 2f from the spacer mount 5 mounting position to the free end side, ensuring satisfactory seek rigidity of the load beam 2f. Further, the loading, bent section, which has been provided on the fixed end side of the load beam 2f in the prior art, is eliminated from the load beam 2f and provided at two positions, that is, the joining site 7f1 of the slider bearing member 10 and the holding site 7f2 of the flexure member 3f.

Thus, provision of the loading, bent section within the flexure member 3f permits the rigidity of the load beam 2f to be satisfactorily ensured, and the size of the slider bearing member 10 may be reduced, making it possible to design a magnetic head supporting mechanism which provides large medium breakoff acceleration even in the case of a light load.

Variants of the second preferred embodiment will be described with reference to FIGS. 21A to 21D and FIGS. 23A to 23C. In order to avoid confusion of the variants of the second preferred embodiment with the first to third variants described above in connection with the first preferred embodiment, the variants of the second preferred embodiment will be described respectively as the fourth to sixth variants.

In the fourth variant, as with the first variant in the first preferred embodiment, the flange 6 in the load beam 2g is eliminated, and, instead, the sheet thickness of the load beam 2g is increased to increase the rigidity of the load beam 2g. Further, the flexure member 3g has been subjected to half etching to reduce the sheet thickness, thereby reducing the slider supporting rigidity.

Figure 22A:
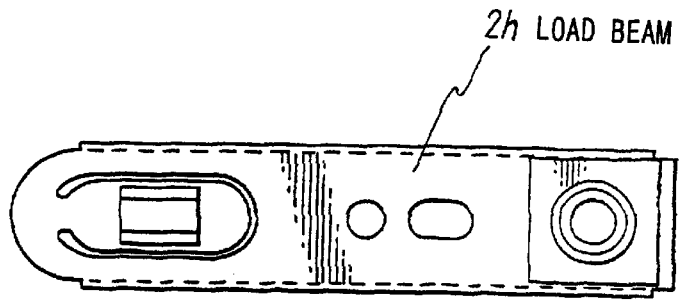
Figure 22B:
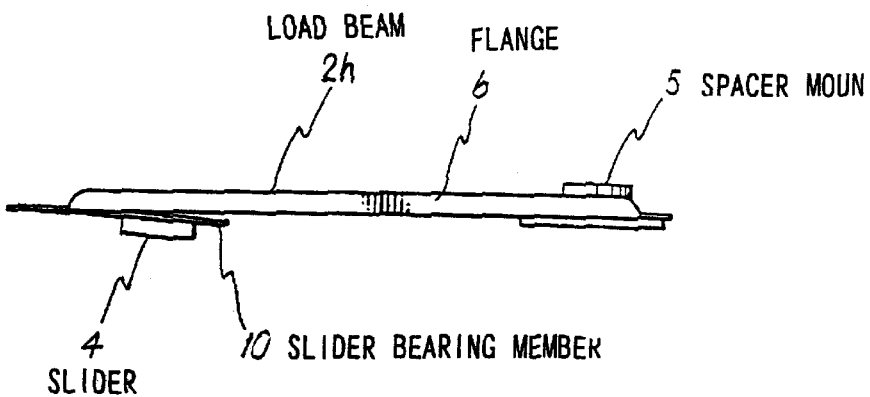
Figure 22C:
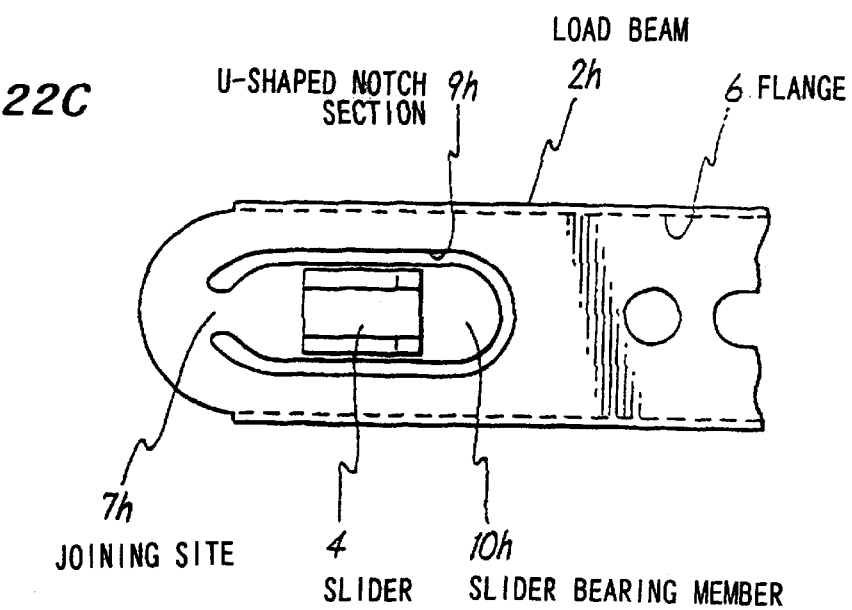

The fifth variant will be described with reference to FIGS. 22A to 22C. This variant is a simplified form of the fourth variant, and one U-shaped notch section 9h is provided so as to have an opening that is open toward the free end side of the load beam 2h. In this way, the tongue-like slider bearing member 10h is formed integrally with the load beam 2h. Further, a loading, bent section having spring properties is provided on only one position, that is, on the joining site 7h of the slider bearing member 10h to apply a pressing load to the slider 4. This variant is different from the first preferred embodiment in that the slider bearing member 10h and the flexure member are common and a loading, bent section having spring properties is provided on only the joining site 7h between the slider bearing section 10h and the load beam 2h.

Figure 23A:
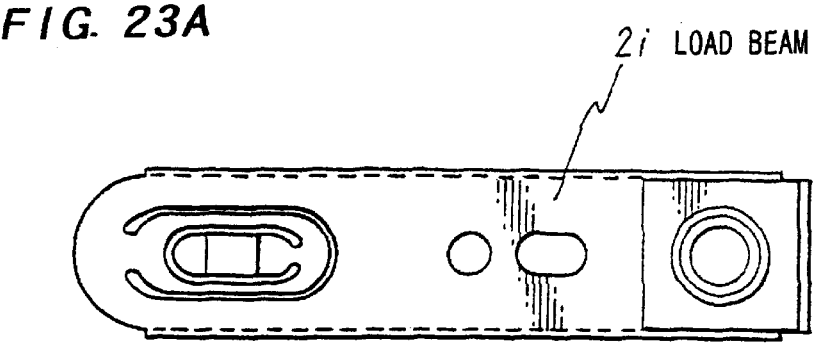
Figure 23B:
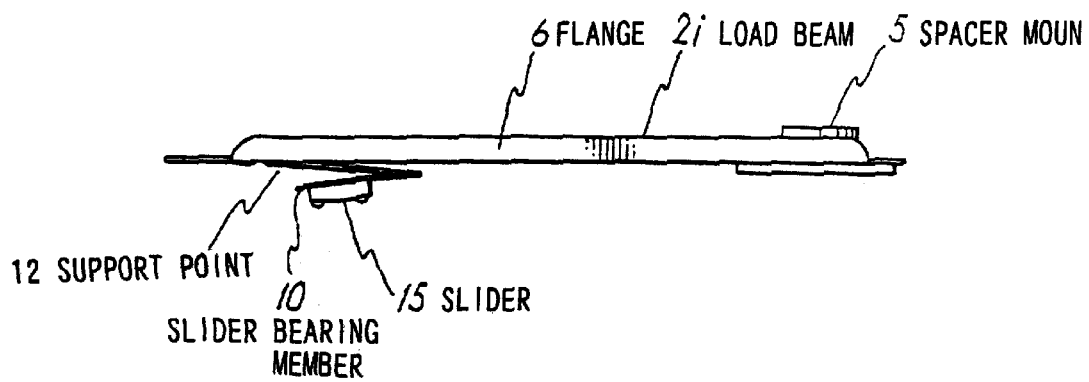
Figure 23C:
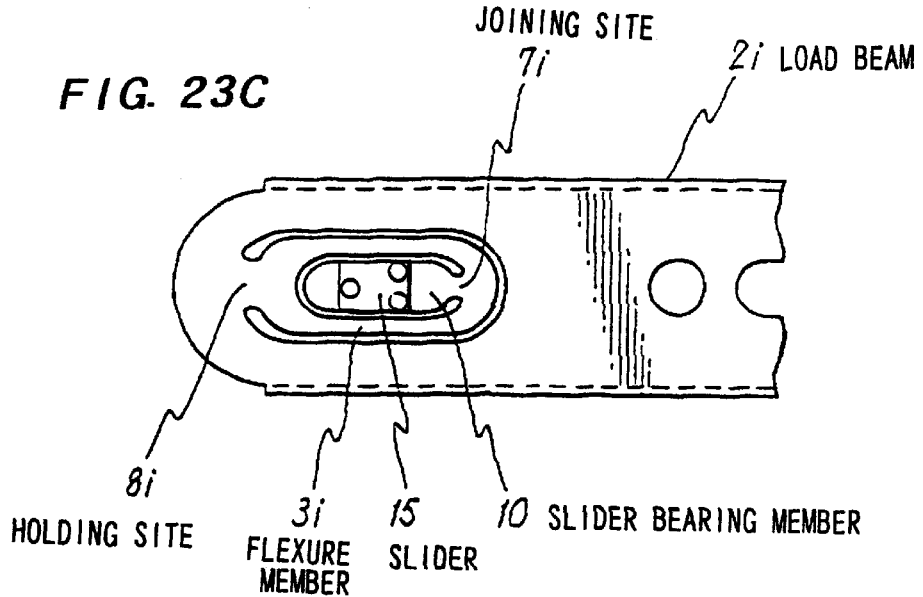

The sixth variant will be described with reference to FIGS. 23A to 23C. In the sixth variant, for the two U-shaped notch sections, the direction of the opening is opposite to that in the two U-shaped notch sections in the fourth variant so that, in the longitudinal direction of the load beam 2i, the position of the joining site 7i of the slider bearing member 10 and the position of the holding site 8i of the flexure member 3i are opposite to those in the fourth variant. As with the third variant of the first preferred embodiment, this variant may be utilized as a contact type slider.

[Third preferred embodiment]

The third preferred embodiment of the present invention will be described with reference to FIGS. 24A to 24C and FIGS. 26A to 26C.

This preferred embodiment relates to a method for inserting and providing the magnetic head supporting mechanism described above in connection with the first and second preferred embodiments into between a plurality of magnetic disks in a magnetic disk storage by means of a magnetic head insertion jig. Therefore, this method can be applied to all the magnetic head supporting mechanisms including various variants described above. For convenience, however, the method will be described by taking the magnetic head supporting mechanism according to the first preferred embodiment as an example.

Figure 24A:
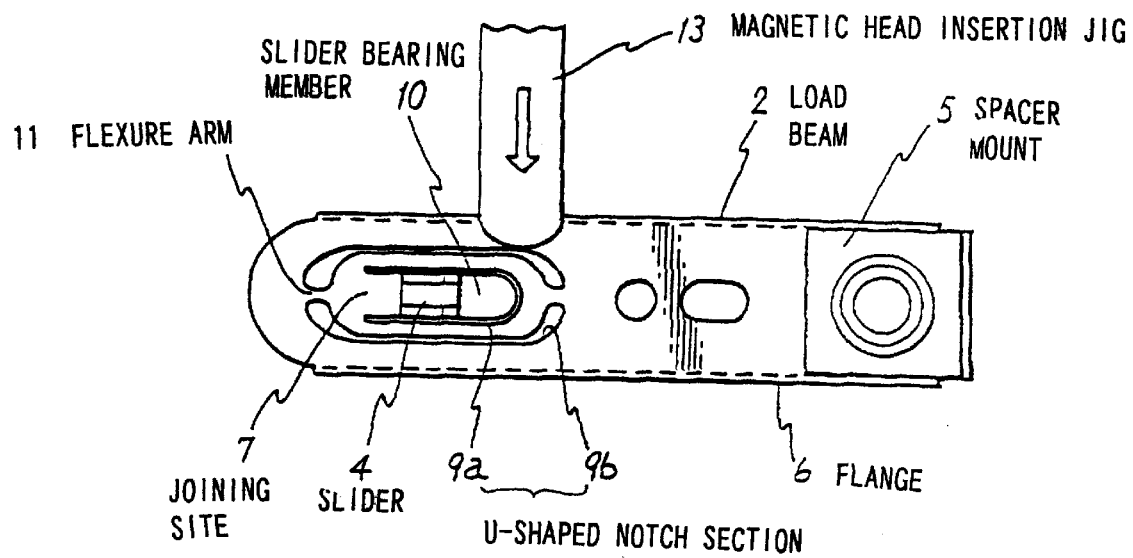
Figure 24B:
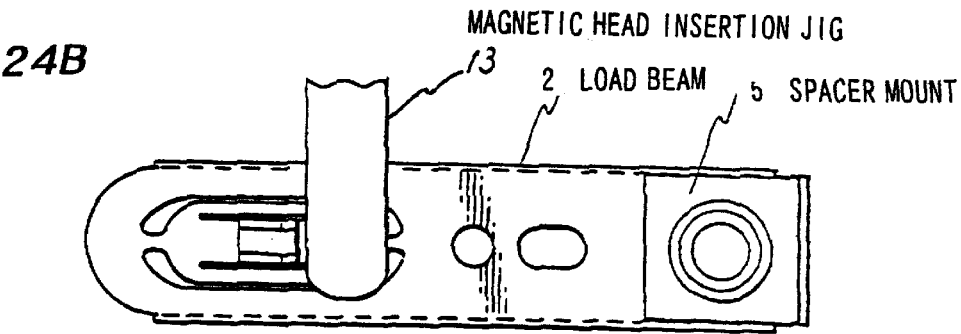
Figure 24C:
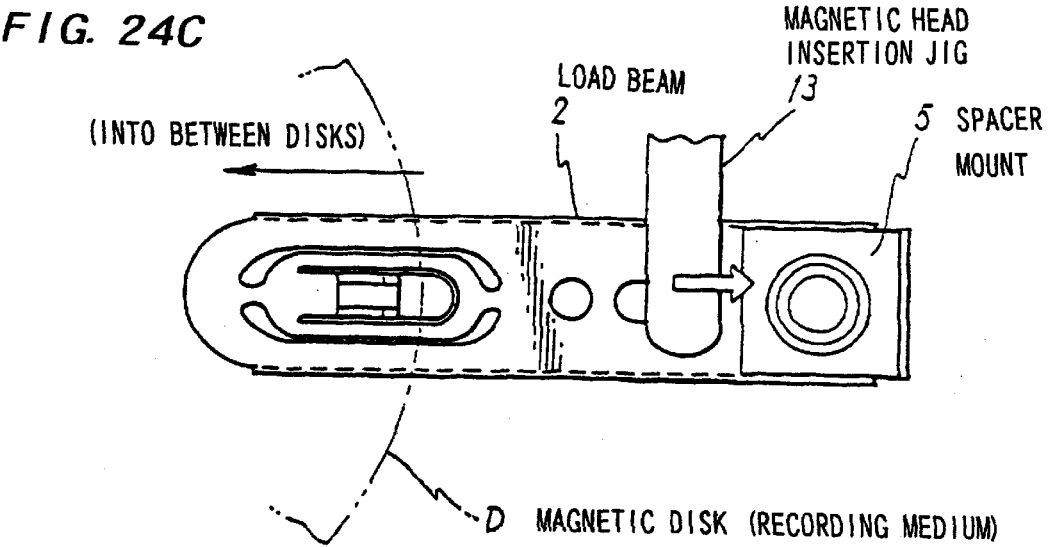
Figure 25A:
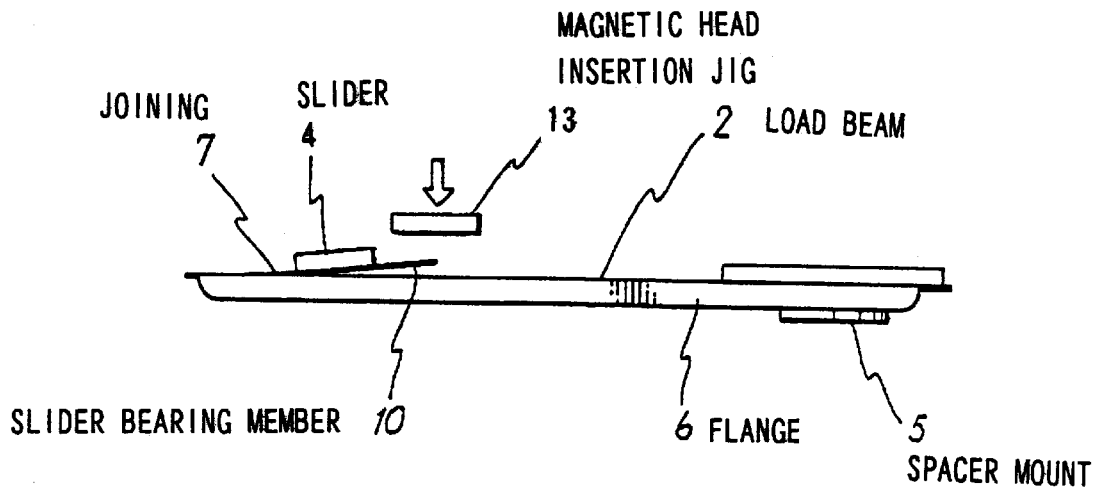
Figure 25B:
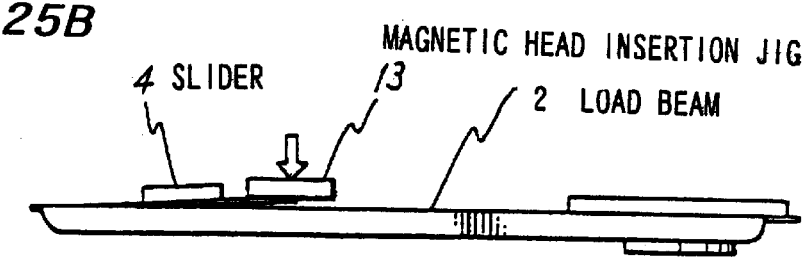
Figure 25C:
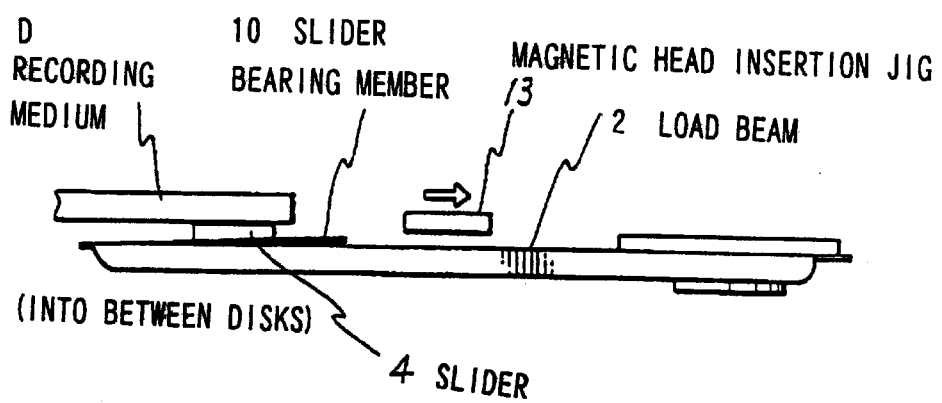

When the slider 4 loaded with the magnetic head is incorporated onto a magnetic disk (a recording medium) D, a magnetic head insertion jig 13 in a thin sheet form is inserted from the fixed end side into the vicinity of the slider 4 (FIG. 24A) and is allowed to abut against the free end side of the slider bearing member 10 (FIG. 25A). Thereafter, the jig is perpendicularly moved downward to regulate the flexure of the loading, bent section provided on the joining site 7 of the slider bearing member 1 so that the slider bearing member 10 is on the substantially the same plane as the load beam 2 (FIG. 25B). In this state, the magnetic head supporting mechanism is transferred onto the magnetic disk D. Thereafter, the magnetic head insertion jig 13 is horizontally moved on the spacer mount 5 side to release the flexure of the loading, bent section of the joining site 7, and the slider 4 is brought into contact with the surface of the magnetic disk D (FIGS. 24C and 25C).

At that time, the thickness of the magnetic head insertion jig 13 should be made smaller than the thickness (0.30 to 0.43 mm) of the slider 4. However, when the thickness is excessively small, the rigidity of the slider 4 per se is unsatisfactory, making it impossible to regulate the flexure of the loading, bent section. In general, a thickness of about 100 $\mu$m suffices for the load of about 1.0 to 3.5 gf.

Further, in order to abut the magnetic head insertion jig 13 against the slider bearing member 10 to press the slider 4, a length large enough to permit satisfactory contact of the magnetic head insertion jig 13 (a latch space) should be ensured at the end section of the slider bearing member 10 remote from the joining site 7. Specifically, a length of about 0.5 mm suffices for satisfactory results. However, in order to avoid the contact of the magnetic head insertion jig 13 with the slider 4, it is necessary to provide a space of about 1 to 2 mm.

Figure 26A:
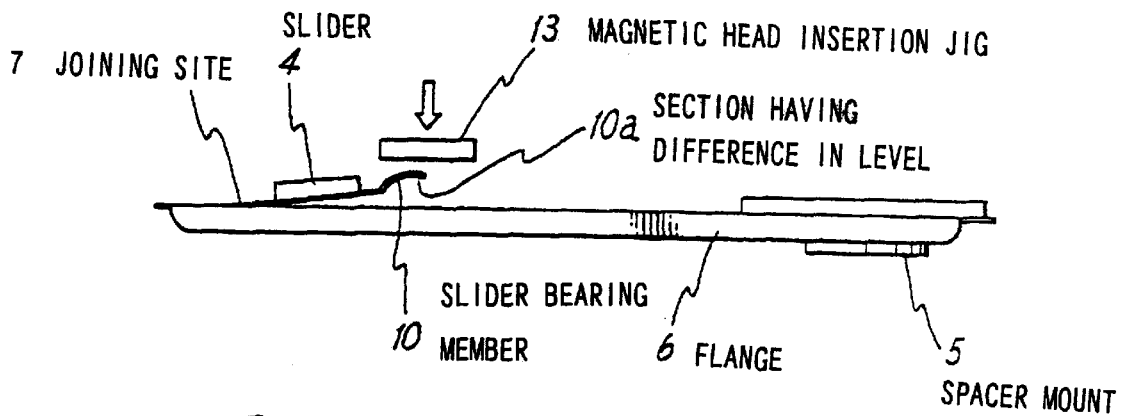
Figure 26B:
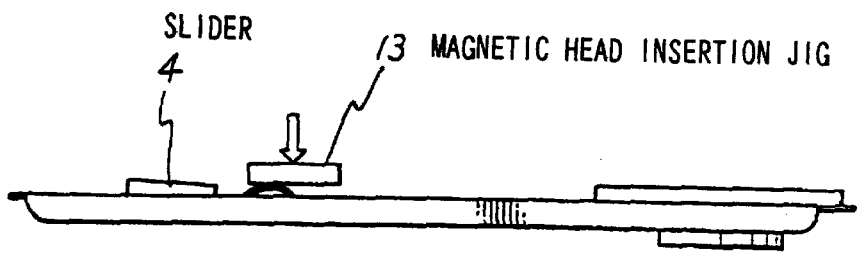
Figure 26C:
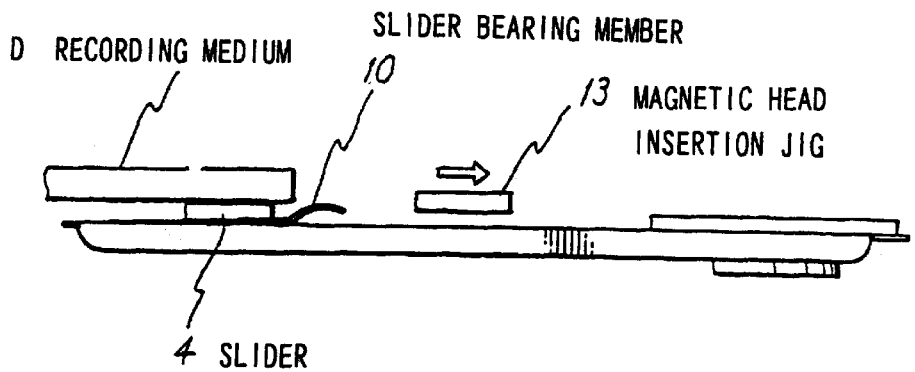

At the time of incorporation of the slider 4 onto the magnetic disk (recording medium) D, when the slider 4 should be pressed to such a larger extent that the slider 4 is on substantially the same plane as the load beam 2, as shown in FIGS. 26A to 26C, a section 10a having a predetermined difference in level is provided in a latch space to regulate the degree of flexure of the slider 4. Since the magnetic head insertion jig 13 in this embodiment may be used also as a clamp jig, the workability for assembling the magnetic head can be significantly improved. Specifically, the loading, bent section of each joining site of the HGA assembly comprising a plurality of pieces of magnetic head supporting mechanisms are previously regulated by a jig in a comb form comprising a plurality of pieces of the magnetic head insertion jig 13 disposed parallel to each other or one another, the HGA assembly in this state is mounted into between the magnetic disks (recording media), the jig in a comb form is horizontally moved toward the load beam fixed end side to remove the jig from the HGA assembly to release the flexure of the joining site, thereby abutting a plurality of magnetic heads against the surface of the magnetic disks all at once. Thus, assembling is easily completed.

Since the loading, bent section, which has been provided on the load beam, is eliminated and, instead, provided within the flexure member, the need to use the clamp jig for horizontally fixing the load beam, which has been used in the prior art, is eliminated. Thus, a method for simply inserting a magnetic head supporting mechanism can be provided.

According to the magnetic head supporting mechanism of the present invention, provision of a loading, bent section of a load beam, which greatly affects the medium breakoff acceleration and dynamic vibration properties, within the flexure member enables excellent impact resistance to be ensured even in the case of magnetic head supporting mechanisms of a light-load design typified by suspension integral with wiring and contact suspensions. At the same time, high seek rigidity can be ensured while keeping the slider supporting rigidity on a low level. This leads to a great advantage that good vibration properties can be provided in a magnetic disk storages and it is possible to cope with an increase in speed and an increase in TPI of the magnetic disk storage.

Further, the workability in incorporating the magnetic head supporting mechanism onto a recording medium can be greatly improved, advantageously contributing to improved productivity.

The invention has been described in detail with particular reference to preferred embodiments, but it will be understood that variations and modifications can be effected within the scope of the present invention as set forth in the appended claims.

What is claimed is:

1. A magnetic head supporting mechanism comprising: a rectangular slider bearing member for bearing a slider loaded with a magnetic head; a flexure member, provided so as to surround the slider bearing member, for supporting the slider bearing member in one end section thereof, as viewed along the longitudinal direction of the slider bearing member through a joining site; and a long load beam sheet, provided so as to surround the flexure member, for supporting the flexure member through a predetermined holding site, the joining site, provided between the slider bearing member and the flexure member, having spring properties, the slider bearing member being inclined toward a load beam.

2. The magnetic head supporting mechanism according to claim 1, wherein a first U-shaped notch section is provided between the slider bearing member and the flexure member so as to surround the slider, and two second U-shaped notch sections are provided between the flexure member and the load beam so as to be symmetrical with respect to the central axis along the longitudinal direction of the load beam and to surround the slider.

3. The magnetic head supporting mechanism according to claim 1, which further comprises: a first U-shaped notch section provided between the slider bearing member and the flexure member so as to surround the slider; and a second U-shaped notch section provided between the flexure member an the load beam so as to surround the flexure member, the joining site between the slier bearing member and the flexure member being provided on one end section of the load beam, the holding site between the flexure member an the load beam being provided on the other end section of the load beam as viewed along the longitudinal direction of the load beam, both the joining site and the holding site having spring properties.

4. A method for assembling a magnetic disk storage, comprising the steps of: providing a magnetic head supporting mechanism comprising a rectangular slider bearing member for bearing a slider loaded with a magnetic head, a flexure member, provided so as to surround the slider bearing member, for supporting the slider bearing member in one end section, as viewed along the longitudinal direction thereof, through a joining site, and a long load beam sheet, provided so as to surround the flexure member, for supporting the flexure member through a predetermined holding site, the joining site, provided between the slider bearing member and the flexure member, having spring properties, the slider bearing member being inclined toward a load beam; and installing the magnetic head supporting mechanism between a plurality of magnetic disks in such a manner that the slider bearing member is pressed to suppress the inclination of the slider bearing member, permitting the slider bearing member to be on substantially the same plane as the load beam and, thereafter, the magnetic head supporting mechanism is inserted between the magnetic disks.

5. The method according to claim 4, wherein a first U-shaped notch section is provided between the slider bearing member and the flexure member so as to surround the slider, and two second U-shaped notch sections are provided between the flexure member and the load beam so as to be symmetrical with respect to the central axis along the longitudinal direction of the load beam and surround the slider.

6. The method according to claim 4, wherein a first U-shaped notch section is provided between the slider bearing member and the flexure member so as to surround the slider, and a second U-shaped notch section is provided between the flexure member and the load beam so as to surround the flexure member, the joining site between the slider bearing member and the flexure member being provided on one end section side of the load beam as viewed along a longitudinal direction of the load beam, the holding site between the flexure member and the load beam being provided on the other end section side of the load beam, both the joining site and the holding site having spring properties.

* * * * *